United States Patent
Bendelac et al.

(10) Patent No.: US 11,829,814 B2
(45) Date of Patent: *Nov. 28, 2023

(54) RESOLVING DATA LOCATION FOR QUERIES IN A MULTI-SYSTEM INSTANCE LANDSCAPE

(71) Applicant: SAP SE, Walldorf (DE)

(72) Inventors: Chaim Bendelac, Kfar Saba (IL); Oleg Koutyrine, Deilheim (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,719

(22) Filed: Nov. 9, 2022

(65) Prior Publication Data

US 2023/0074856 A1 Mar. 9, 2023

Related U.S. Application Data

(63) Continuation of application No. 17/182,984, filed on Feb. 23, 2021, now Pat. No. 11,513,876.

(51) Int. Cl.
  *G06F 9/54* (2006.01)
  *G06F 16/245* (2019.01)
(52) U.S. Cl.
  CPC ............ *G06F 9/547* (2013.01); *G06F 16/245* (2019.01)
(58) Field of Classification Search
  CPC ......... G06F 9/541; G06F 9/547; G06F 16/245
  See application file for complete search history.

(56) References Cited

U.S. PATENT DOCUMENTS

| | | |
|---|---|---|
| 8,768,915 B2 | 7/2014 | Gao et al. |
| 9,170,810 B2 | 10/2015 | Koutyrine et al. |
| 9,690,558 B2 | 6/2017 | Bendelac et al. |
| 9,734,230 B2 | 8/2017 | Sarferaz |
| 10,353,923 B2 | 7/2019 | Han et al. |
| 10,666,528 B1 | 5/2020 | Okman et al. |
| 10,698,913 B2 | 6/2020 | Murthy et al. |
| 11,513,876 B2 * | 11/2022 | Bendelac ................. G06F 9/547 |

(Continued)

OTHER PUBLICATIONS

Aws.Amazon.com [online], "Amazon Atehna FAQs" Jul. 2017, [retrieved on Mar. 3, 2021], retreived from: URL <https://aws.amazon.com/athena/faqs/>, 15 pages.

(Continued)

*Primary Examiner* — Brian W Wathen
(74) *Attorney, Agent, or Firm* — Fish & Richardson P.C.

(57) ABSTRACT

The present disclosure involves systems, software, and computer implemented methods for resolving data location for queries in a multi-system instance landscape. One example method includes receiving a request for data for at least one entity that includes a qualified identifier that includes a system tenant qualifier and a local identifier. The system tenant qualifier identifies a system tenant in a multi-system tenant landscape and the local identifier identifies an entity instance of an entity in the system tenant. A routing policy table configured for the multi-system tenant landscape is identified and a cell is located in the routing policy table that corresponds to the entity and the system tenant. A routing policy is determined for routing the request based on the cell. The routing policy is used to determine a target system tenant to which to route the request and the request is provided to the target system tenant.

20 Claims, 14 Drawing Sheets

(56) References Cited

U.S. PATENT DOCUMENTS

| | | | |
|---|---|---|---|
| 2005/0022174 A1 | 1/2005 | Lauterbach et al. | |
| 2005/0257210 A1 | 11/2005 | Stienhans et al. | |
| 2013/0091491 A1 | 4/2013 | Koutyrine et al. | |
| 2014/0207759 A1 | 7/2014 | Park et al. | |
| 2015/0006730 A1 | 1/2015 | Helfman et al. | |
| 2017/0262266 A1 | 5/2017 | Bendelac et al. | |
| 2019/0138376 A1 | 5/2019 | Christy et al. | |
| 2020/0201865 A1 | 6/2020 | Siebeking et al. | |
| 2020/0228629 A1 | 7/2020 | Li | |
| 2021/0314265 A1* | 10/2021 | Zhu | H04L 45/54 |
| 2022/0269552 A1 | 8/2022 | Bendelac et al. | |

OTHER PUBLICATIONS

Graversen, "SAP Graph, Making it Easier to Access SAP Data" Sep. 2019, [retrieved on Mar. 3, 2021], retrieved from: URL <https://blogs.sap.com/2019/09/25/sap-graph-making-it-easier-to-access-sap-data/>, 6 pages.

Quamar et al., "Enabling Rich Queries Over Heterogeneous Data From Diverse Sources In HealthCare." CIDR. 2020, 6 pages.

* cited by examiner

A landscape Routing Policy can be defined using a table RP, with a cell for each entity and ST:

| Entity E \ ST | Sys1 | Sys2 | Sys3 | ... |
|---|---|---|---|---|
| CustomerOrder | | | | |
| Customer | | | | |
| Product | | | | |
| ... | | | | |

700

Where each cell can have the following possible values:

| Policy | The meaning of this cell | What to do with a request for E with QID: ST~ID |
|---|---|---|
| LS | LEAD SYSTEM. This ST is the lead system for E | Fetch the data for E from this ST (LS) using the local ID |
| L | LOCAL reference E is fully replicated in this ST, can use the local ID locally (typical/default) | Fetch the data for E from this ST using the local ID |
| X | CROSS reference ST doesn't have a local replica of E, all references can therefore assumed to be to the lead system | Fetch the data for E from the leading system using the local ID |
| XM | CROSS reference after MAPPING ST has local replica of E, but the data can be fetched from the lead system | Map ID via IDM service to the ID of the leading system, then use the returned ID to fetch the data from the leading system (LS) |

| Entity | ST | Sys1 | | Sys2 | | Sys3 | | Explanation |
|---|---|---|---|---|---|---|---|---|
| CustomerQuote | | x | 920 | LS | 918 | x | 922 | Not replicated |
| Customer | | LS | 930 | L | 932 | L | 934 | Replicated with local IDs, respond with local copy |
| Product | | XM | 938 | XM | 940 | LS | 936 | Replicated with local IDs, follow references to leading system |
| SalesOrganization | | LS | | x | | x | | Not replicated |

FIG. 9

RESOLVING DATA LOCATION FOR QUERIES IN A MULTI-SYSTEM INSTANCE LANDSCAPE

CLAIM OF PRIORITY

This application claims priority under 35 USC § 120 to U.S. patent application Ser. No. 17/182,984, filed on Feb. 23, 2021, the entire contents of which are hereby incorporated by reference.

TECHNICAL FIELD

The present disclosure relates to computer-implemented methods, software, and systems for resolving data location for queries in a multi-system instance landscape.

BACKGROUND

Organizations can use computing systems to manage various aspects of the operations of the organization. For example, an ERP (Enterprise Resource Planning) system can be used to manage various lifecycle activities of an enterprise organization. For example, an ERP system can be used to manage human resources, operational aspects, sales and marketing, product management, financial aspects, vendor and supplier relationship management, and formal reporting.

SUMMARY

The present disclosure involves systems, software, and computer implemented methods for resolving data location for queries in a multi-system instance landscape. An example method includes: receiving, from a client application, a request for data for at least one entity, wherein the request includes a first qualified identifier that includes a first system tenant qualifier and a first local identifier, wherein the first system tenant qualifier identifies a first system tenant in a multi-system tenant landscape, the first local identifier identifies an entity instance of a first entity in the first system tenant, and the request is based on a unified data model that represents commonality of respective data models used by multiple system tenants in the multi-system tenant landscape; identifying a routing policy table configured for the multi-system tenant landscape; locating a first cell in the routing policy table that corresponds to the first entity and the first system tenant; determining a routing policy for routing the request based on the first cell, wherein determining the routing policy includes determining a target system tenant to which to route the request; providing, to the target system tenant, the request; receiving, from the target system tenant, a response to the request; providing, to the client application and in response to the request, the response.

Implementations may include one or more of the following features. Before providing the request to the target system, the request can be translated from the unified model into a target data model of the target system tenant. Before providing the response to the client application, the response can be translated from the target data model to the unified model. The request can be sent using a unified API (Application Programming Interface) that enables the client application to request data from any of the systems tenants in the multi-system tenant landscape. The first cell can identify the first system tenant as a lead system tenant that is a source of truth for the first entity. Determining the routing policy can include determining that the routing policy is a lead system policy and that the first system tenant is the target system tenant. The request can be provided to the first system tenant. A second system tenant can be configured in the routing policy table as the source of truth for the first entity. The first cell can identify the first system tenant as including a consistent replica of the first entity. Determining the routing policy can include determining that the routing policy is a local reference policy and that the first system tenant is the target system tenant based on the first system tenant including the consistent replica of the first entity. The request can be provided to the first system tenant. The first cell can identify the first system tenant as not storing the first entity. A second cell can be located in the routing system table that identifies a second system tenant as the source of truth for the first entity. Determining the routing policy can include determining that the routing policy is a cross reference policy and that the second system tenant is the target system tenant. The request can be provided to the second system tenant. The first cell can identify the first system tenant as storing the first entity but not as the source of truth for the first entity and with different identifier values than the source of truth for the first entity. A second cell can be located in the routing system table that identifies a second system tenant as the source of truth for the first entity. The first local identifier can be mapped from a first identifier range used by the first system tenant to a second identifier range used by the second system tenant. Determining the routing policy can include determining that the routing policy is a cross reference after mapping policy and that the second system tenant is the target system tenant. The request can be provided to the second system tenant. Translating the request from the unified model into the target data model can involve including, in the request, the first local identifier but not the first system tenant qualifier. Translating the request from the unified model into the target data model can include mapping a name of the first entity to a corresponding entity name in the target data model and replacing, in the request, the name of the first entity with the corresponding entity name. Translating the request from the unified model into the target data model can include mapping a field name in the request to a corresponding field name in the target data model and replacing, in the request, the field name with the corresponding field name. The request can be for data for more than one entity and multiple sub-requests for entity data can be identified in the request. Determining a routing policy for each sub-request can include determining a target system tenant for each sub-request. The sub-requests can be provided to the respective target system tenants.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 7 illustrates an example routing policy table.

FIG. 9 illustrates an example routing policy table.

DETAILED DESCRIPTION

Figure 1:
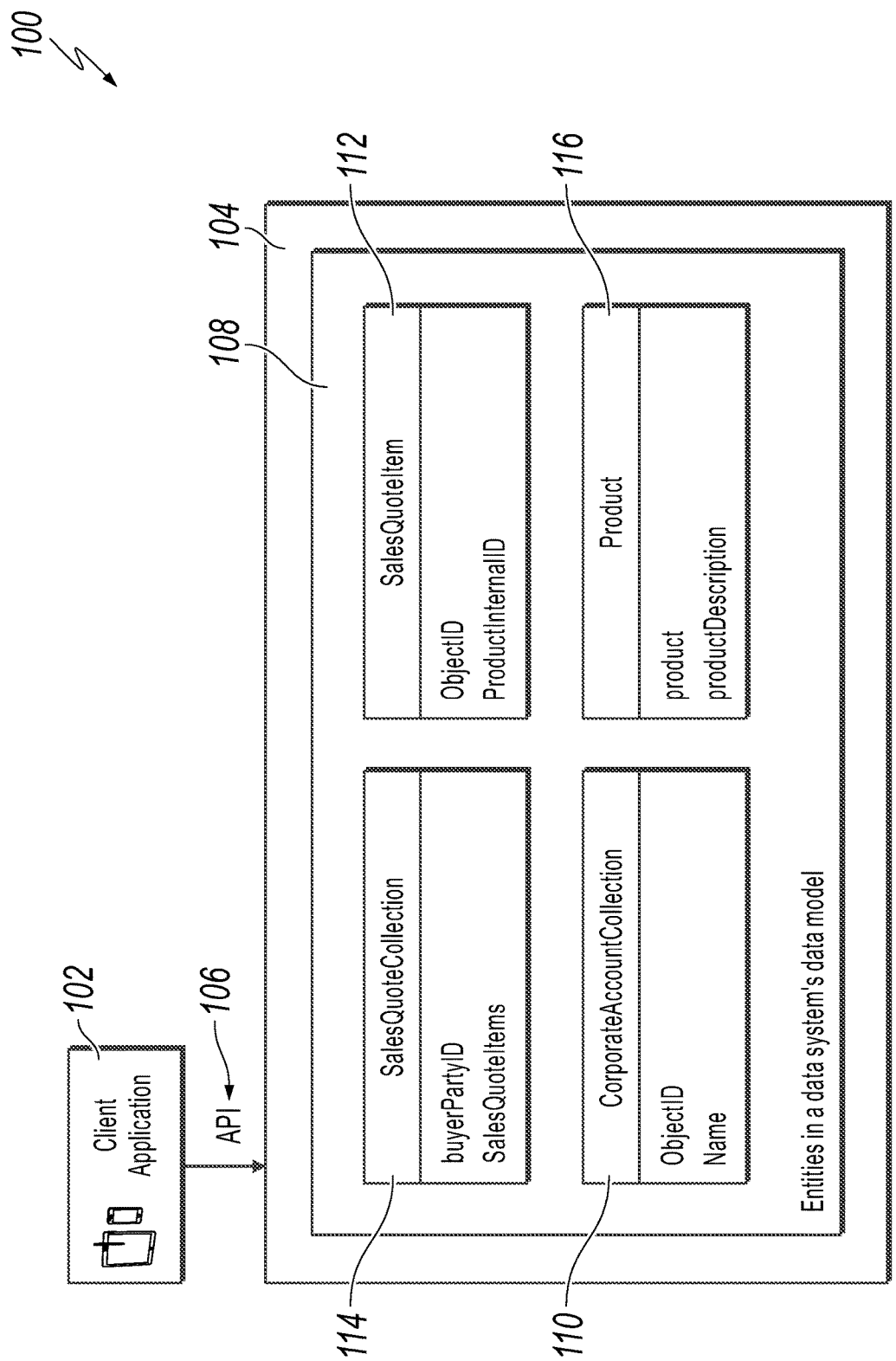
FIG. 1 illustrates an example system that includes a client application accessing a data model.

Enterprises and other companies can deploy a variety of software solutions (e.g., ERP solutions) to manage organizational processes. While integrated ERP solutions exist, typically customers establish a portfolio of different products, sometimes from different vendors, to address unique process needs. Managing a workflow across multiple solutions, from the same vendor or different vendors, can introduce various challenges.

For example, when considering a product catalog, a consideration can be to determine (or discover) which system in the landscape manages the product catalog. One possibility is that one of the solutions (e.g., a "lead system") manages the product catalog. In this type of situation, other solutions can refer to a product by its unique identifier, and queries to the lead system can be performed for obtaining additional product information. As another example, the product catalog may be present in multiple systems, in duplicate, to avoid cross-system queries. Having a product catalog in different systems can result in a situation of different identifier ranges. For example, a product may appear in one system with a local product identifier of, for example, 123, while the same product may be listed in the second system with a local identifier of, for example, AZ-456. Additionally, transactional data may be copied or synchronized from one system to another. A common use case can be a "purchase order" which traverses from a first system where it was entered to a second system where it is processed. In some landscapes, the purchase order identifiers are preserved between systems, but in another landscape, each system may have its own identifier range.

For these and other reasons, querying across systems using only one set of local identifiers is generally not possible. Further, requiring application developers to know and deal with different identifiers, interfaces, and models can be unacceptably burdensome. One approach is having all systems agree on globally unique identifier values to indicate same data instances. However, having all systems use globally unique identifiers can result in unacceptable, difficult, or costly modifications to each system.

Instead of global identifiers, qualified identifiers can be introduced and managed by a middleware layer. Qualified identifiers can be implemented as a simple annotation of local identifiers and can enable cross-system queries. With qualified identifiers, an application developer can benefit from being able to query data across different systems in a manner as though the different systems comprised a single logical system. For example, the middleware layer can provide a single-system abstraction.

The middleware layer can enable customers to install different systems from different vendors, with some or all systems independently maintaining related, but separately stored, sets of data, which may be in different formats and be associated with different identifiers that are internally consistent, but are not consistent across all systems. The middleware layer can handle routing decisions for determining target systems to which to route query requests for particular entities. Routing, as described herein, refers to determining which system instances out of potentially multiple system instances to access when locating data for a given query. The middleware layer can work with existing data and non-global local references stored in existing landscapes and systems without requiring changes to systems in the landscape.

Client application developers can provide the middleware layer with queries that may cross systems. The middleware layer can provide, without application developer effort or knowledge, the required and/or necessary query routing and identifier mapping to obtain or access the intended information, thus isolating the application developer from having to know exactly where different data is stored. In contrast to attempted solutions that assume that all references are globally referenceable, the use of qualified identifiers for query routing is an efficient solution for landscapes that include existing systems that have incompatibilities between systems, which may include different data, storing semantically-corresponding data in different formats among different systems, different APIs (Application Programming Interfaces), and/or different or inconsistent identifiers, among other incompatibilities. Various other additional advantages of qualified identifiers are discussed below with respect to FIG. 6.

FIG. 1 illustrates an example system 100 that includes a client application accessing a data model. The system 100 illustrates an example without use of the middleware layer. Developers belonging to either a customer or a partner organization can develop a client application 102 that interfaces with an organizational data system 104. The client application 102 can provide value to users (e.g., employees, customers, etc.) of the organization for one or more aspects of the organization. The client application 102 can be referred to as an extension application that can be distinguished from standard applications provided by a vendor.

The client application 102 can use an API 106 to access data in a data model 108. The data model 108 can store data for various entities that represent objects relevant to the organization. For instance, and in the illustrated example, the data model 108 includes a corporate account collection 110 (e.g., for customers of the organization), a sales quote item entity 112, a sales quote collection entity 114, and a product entity 116. The client application 102 can use the API 106 to query for information for the entities 110, 112, 114, 116, and/or other entities. The data model 108 can include relations between related entities, and those relations can be traversed when retrieving data for a given query. Although the client application 102 is shown as accessing a single organizational data system 104, a landscape of a given organization may include multiple, different data systems, and the client application 102 may require and request data from more than one system. However, as described below, with an improved approach, the client application 102 can instead use the middleware layer rather than access separate systems.

Figure 2:
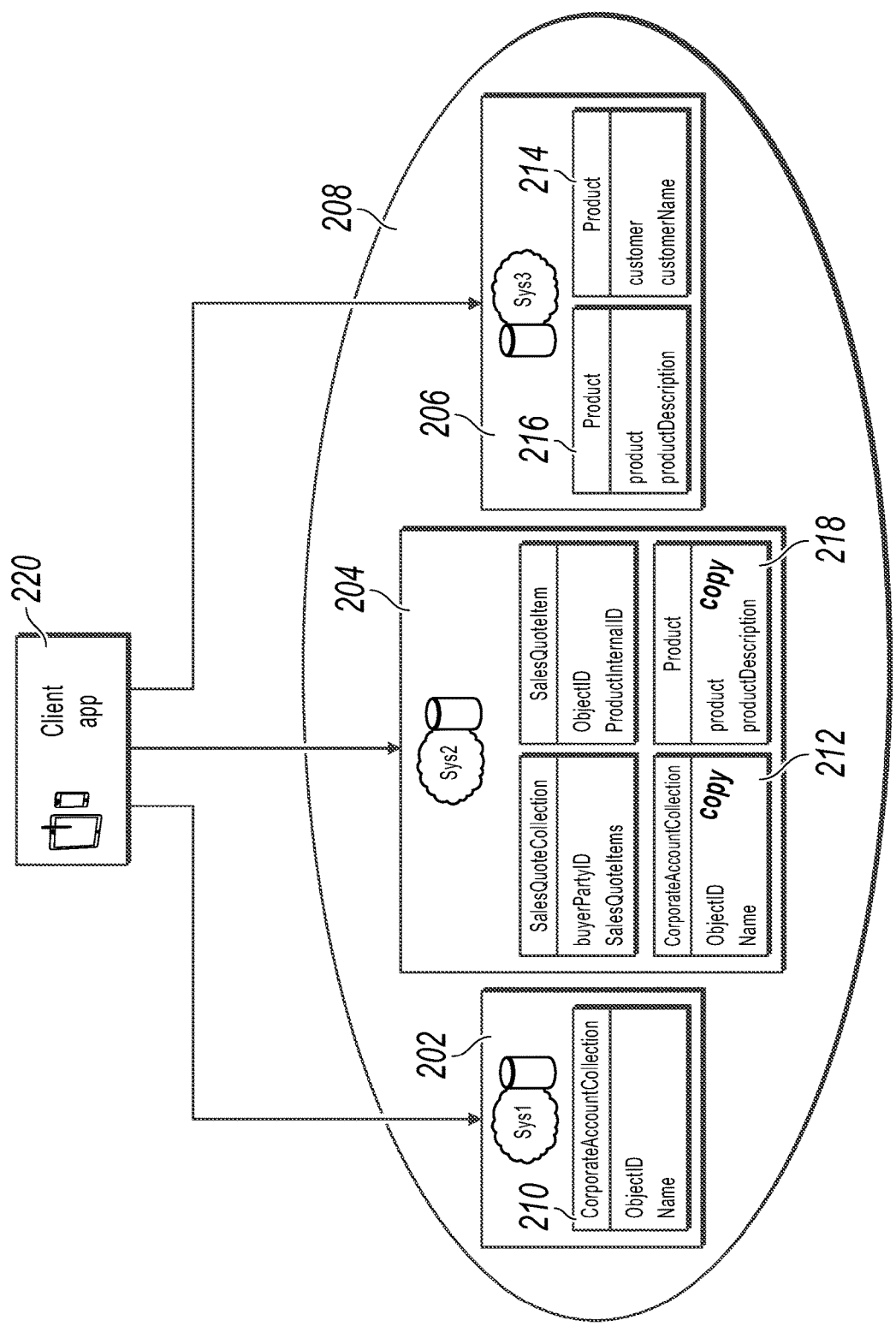
FIG. 2 illustrates an example system that includes multiple data system tenants.

FIG. 2 illustrates an example system 200 that includes multiple data system tenants. The system 200 illustrates a multi-system example without use of the middleware layer. For instance, the system 200 includes a first data system tenant 202, a second data system tenant 204, and a third data system tenant 206 in a multi-system landscape 208 of a particular organization. An organization may use multiple different systems (and/or system tenants) for managing the organization, with different systems or system tenants providing certain features that may be specialized for different aspects of the organization. An organization can deploy a variety of software solutions to manage organizational processes, for example. An integrated ERP solution can solve a number of problems, but an organization may still use other systems to address specific organizational needs. Specialized software products can be used for CRM (Customer Relationship Management), manufacturing, financials, etc. In some cases, the ERP service provider may have acquired other software products and can enable the organization to use the standard ERP solution along with other products. Additionally, the organization can use products from other vendors.

As used herein, "data system tenant" and "system tenant" can refer and apply to different instances of a given type of software solution system. A system tenant can be a tenant of a cloud-based system or can refer to and apply to an instance of an on-premise system. As such, "data system tenant", "system tenant", and "system instance" can be viewed as synonymous with respect to this disclosure. Additionally, "multi-system landscape" can refer to a landscape that may have different types of systems, different instances of a same type of system, and/or both different systems and different instances of a same type of system. Each system instance (or system tenant) can have a separate data area, and the methods described herein can be used to resolve data location for queries in a multi-system instance landscape.

As another landscape example, due to complex constraints or requirements, an organization may have multiple copies of one or more data systems. For instance, a company may have acquired another company resulting in a subsidiary, and for legal reasons, the parent company may need to keep data of the subsidiary separate from the parent company. Accordingly, the company may use similar systems (or different instances of a same system) for both the parent company and the subsidiary that perform similar functions. As another example, a company with a broad product catalogue may decide to use different versions of various systems for different products to more effectively manage data and activity for the different products. As yet another example, a company may use one system to manage, for instance, European operations and another system to manage United States operations. In summary, for a variety of reasons, such as system functionality, performance, locale, and/or regulatory, an organization may distribute data over multiple systems which can cause complexities for replication and data access.

In the multi-system landscape 208, the first data system tenant 202, the second data system tenant 204, and the third data system tenant 206 may be from the same or different vendors. Each data system or software product may have been engineered by a different team of engineers, and may have different APIs and/or different data models, even for similar entities. For example, different system tenants can each have an entity that represents a customers of the organization.

For instance, the first data system tenant 202 includes a CorporateAccountCollection entity 210, the second data system tenant 204 includes a CorporateAccountCollection entity 212, and the third data system tenant 206 includes a Customer entity 214. The CorporateAccountCollection entity 212 is, in this example, a replica or copy of the CorporateAccountCollection entity 210. The Customer entity 214 may have a different name, and different field names, from the CorporateAccountCollection entity 210 and the CorporateAccountCollection entity 212 due to one or more of the respective data systems being acquired from another customer, for example.

Some data may exist in some but not all systems. For instance, the third data system tenant 206 includes a Product entity 216. The second data system tenant 204 includes a Product entity 218 that is a replica/copy of the Product entity 216. The first data system tenant 202 does not include a product-related entity. Additionally, even when similar data exists in different systems or system tenants, incompatibilities and inconsistencies can exist between identifiers, other content, and semantics of different sets of data. Replication, integration, and consistency processes can be performed to provide a cohesive set of data for the organization.

Developers of a client application 220 can face various challenges when developing an application for the multi-system landscape 208. The client application 220 may require data from multiple, different systems, with each system having a different API and/or a different data model. In previous solutions, each developer may need to understand the complex multi-system landscape 208, such as understanding 1) different interfaces and data models; 2) which systems or tenants include which data; and 3) which copy of multiple copies of data is an authoritative source of the data, to name a few examples. When data is retrieved from multiple systems or tenants, a developer may need to understand how data is related and how references between related sets of data are to be interpreted, or in some cases, modified.

For example, the first system tenant 202 may be a CRM system instance, and the CorporateAccountCollection entity 210 may represent a master customer list. The second data system tenant 204 may be an ERP system instance, and the product entity 218 may represent a product list. A developer of the client application 220 may desire to code the client application 220 to query the multi-system landscape 208 to determine which customers have purchased which products. Performing the query may involve accessing both the first system tenant 202 and the second system tenant 204 and retrieving data from both system tenants by identifying and handling relationships between different entities in different systems. The developer may need to know which of the entities in the multi-system landscape represents a master copy of a customer list or a master copy of a product list (e.g., since multiple systems or tenants may have customer or product related entities).

In addition to the developer needing to know these types of complexities, once configured, the client application 220 can become dependent on the current specifics of the complexities. For instance, the multi-system landscape 208 can be later reconfigured so that a different entity (e.g., the Customer entity 218) is a master copy of a customer list, rather than the CorporateAccountCollection entity 210. Accordingly, the client application 220 may need to be recoded.

Developers, client applications, and customers can all face challenges due to the complexities described above. These problems can continue as other products are developed or acquired. Rather than having a developer (or an associated client application) deal with these complexities, an abstract layer can be introduced that manages and shields client application developers and client applications from complexities of distributed or replicated data in the multi-system landscape.

Figure 3:
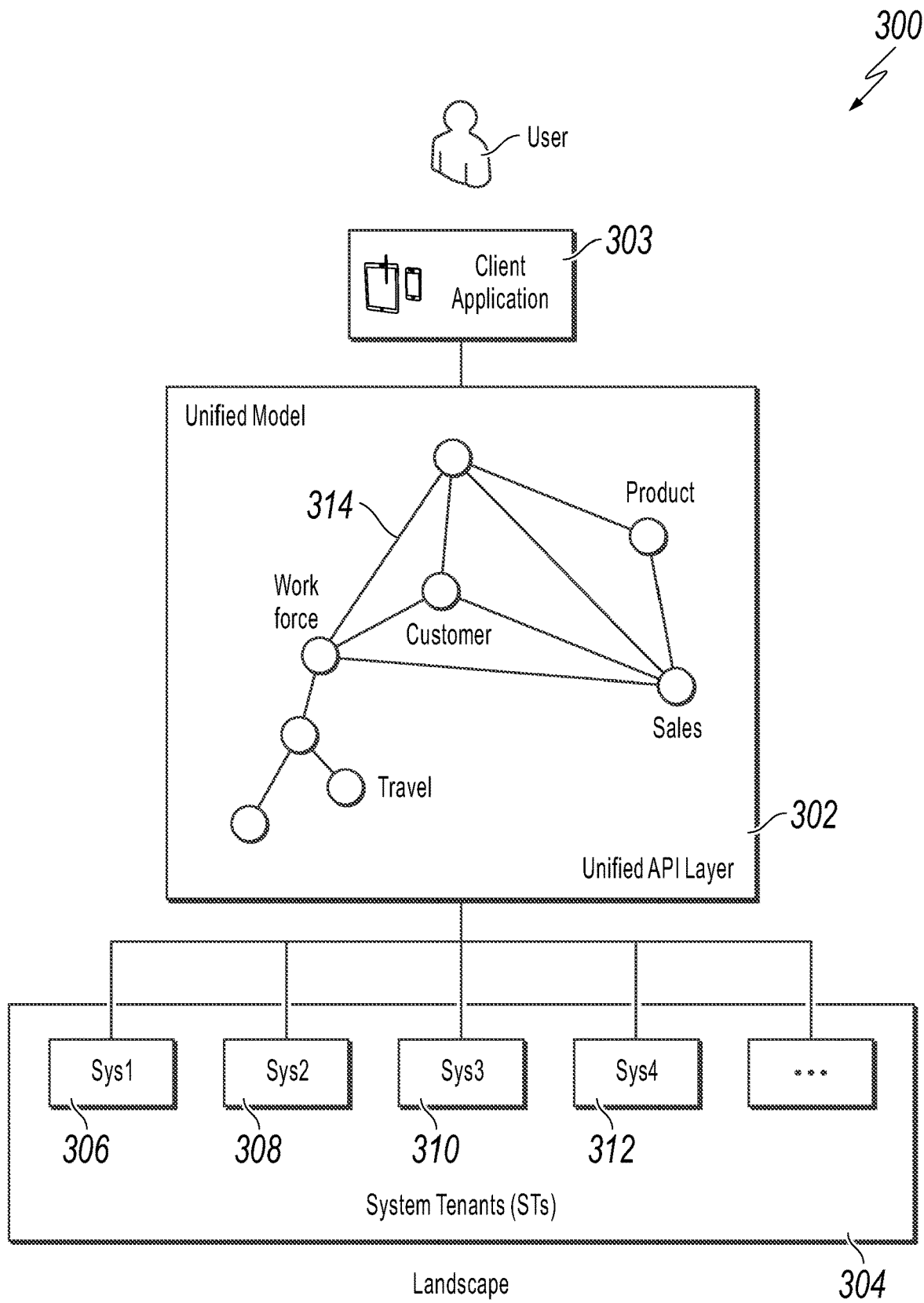
FIGS. 3-4 illustrate example systems that includes a unified API layer.

FIG. 3 illustrates an example system 300 that includes a unified API layer 302. Rather than having each developer and each client application, such as a client application 303, deal with various complexities of accessing data from multiple systems in a multi-system landscape 304, the unified API layer 302 can provide an abstraction layer to client applications to shield them from complexities of understanding differences between multiple systems or tenants, such as a first system tenant 306, a second system tenant 308, a third system tenant 310, and a fourth system tenant 312. The unified API layer 302 is a middleware component that can understand and deal with multi-system complexity and determining which system instance(s) to access to locate specific data, without requiring the client applications 303 to be aware of the same.

The unified API layer 302 can provide, include, or otherwise enable access to a unified model 314. The unified model 314 can be a unified data model that includes a unified set of entities that represent a logical superset of entities provided by the different systems or tenants in the multi-system landscape 304. The client application 303 and other applications can express data requests using the unified model 314. The unified API layer 302 can translate an application request into specific request(s) to respective system(s) or tenant(s) in the multi-system landscape 304, as needed. In some instances, a single request may require multiple subsequent requests to various systems or tenants in the landscape 304, if applicable. Neither the client application 303 nor the application developer(s) need to know exact details of which data resides in which landscape system. Additionally, client applications can use relations in the unified model 314 to navigate related data.

Figure 4:
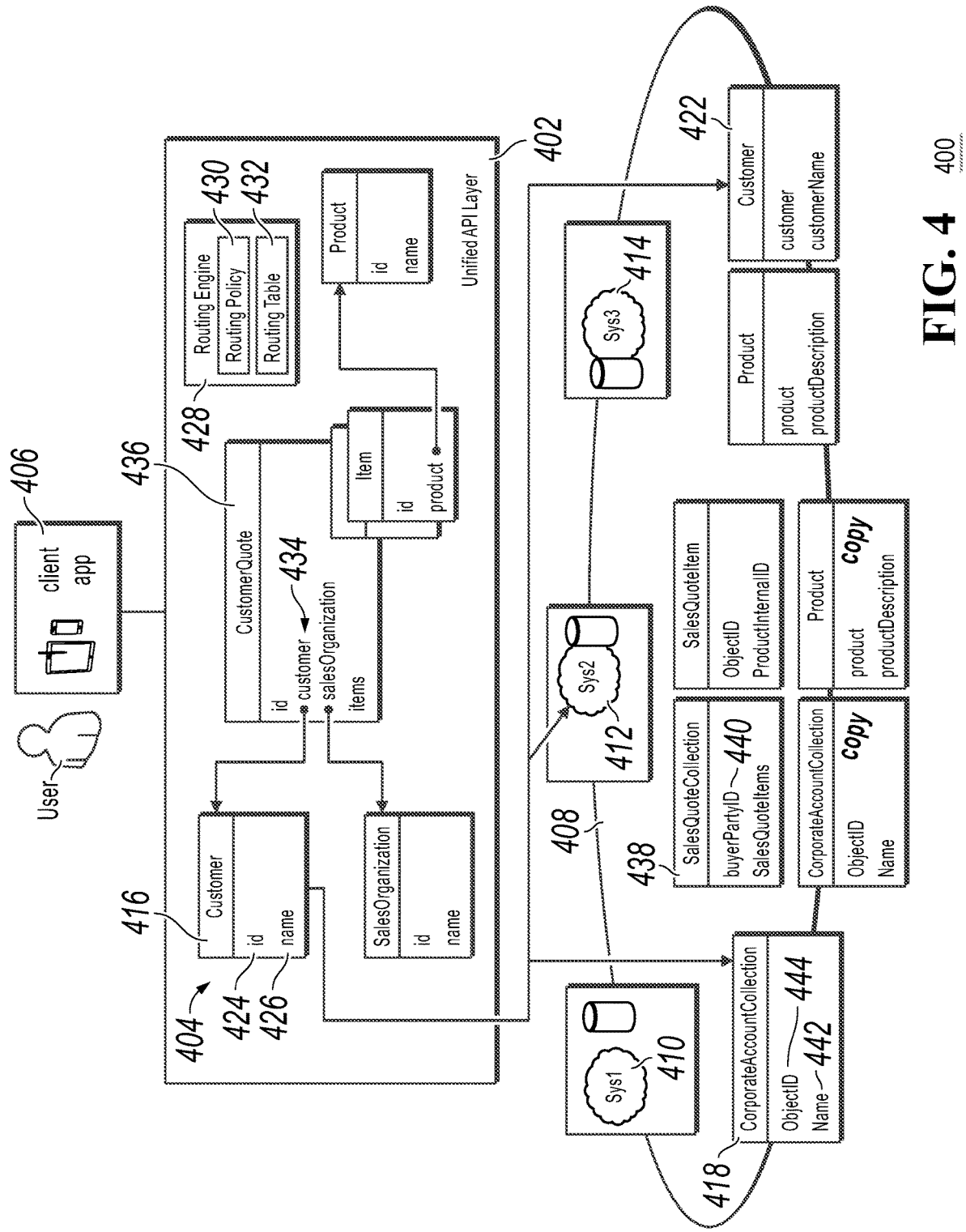

FIG. 4 illustrates an example system 400 that includes a unified API layer 402. The system 400 illustrates a more detailed view of a unified model 404 associated with the unified API layer 402. A client application 406 can interface with (e.g., request, use) entities in the unified model 404 rather than entities in specific systems in a multi-system landscape 408, such as a first system tenant 410, a second system tenant 412, or a third system tenant 414. The unified model 404 provides a single data model that is a consistent view of data across all of the systems and tenants of the multi-system landscape 408.

The client application 406 can use a Customer entity 416, for example, rather than a CorporateAccountCollection entity 418, a CorporateAccountCollection entity 420, or a Customer entity 422. The unified API layer 402, on behalf of the client application 406, can determine which entities (and which systems) to access in the multi-system landscape 408 as appropriate sources of data when the client application 406 requests the Customer entity 416. The client application 406 no longer needs to be concerned with determining which systems or tenants correspond to a client application request or with connecting to multiple systems. Additionally, the client application 406 can use a consistent set of field names (e.g., an id field 424 and a name field 426, for the Customer entity 416) for each accessed entity, rather than having to deal with inconsistent field names between semantically similar entities that exist across systems. The client application 406 can use (and application developers can learn) one model rather than multiple models.

The unified API layer 402 can, for a given query received from the client application 406, parse the query to determine which portions correspond to entities in different systems (e.g., a query may ultimately result in retrieving data from multiple systems). The unified API layer 402 can connect to a respective system to retrieve data for each determined query portion. As described in more detail below, the unified API layer 402 can use a routing engine 428 to determine which system or systems to connect to retrieve data for a given request from a client application. The routing engine 428 can implement a routing policy 430, which can use information in a routing table 432, to determine which systems to connect to retrieve data for entities referenced in the client application request.

Routing can include navigating references in the unified model 404, and corresponding references in underlying data models in specific systems. For example, a client application request may correspond to requesting data for customer quotes for various customers. The routing engine 428 can navigate a customer reference 434 in a CustomerQuote entity 436, to retrieve the name of a customer using the name field 426. In further detail, the routing engine 428 may need to traverse and/or map references that ultimately refer to an entity in another system or tenant. For example, responding to a logical request expressed using the unified model 404 to retrieve data for customer quotes for various customers may result in the unified API layer 402 retrieving data from a SalesQuoteCollection entity 438 in the second system tenant 412, navigating a buyerPartyID reference 440 in the SalesQuoteCollection entity 438, and navigating to the first system tenant 410 to retrieve a name field 442 value of a corporate account instance of the CorporateAccountCollection entity 418 (e.g., a customer) whose ObjectID field 444 value matches the retrieved buyerPartyID reference 440. In some cases, and as described below, identifier mapping between identifiers of different system tenants can be performed. As described below, identifiers used in the unified model 404 can be qualified identifiers.

Figure 5:
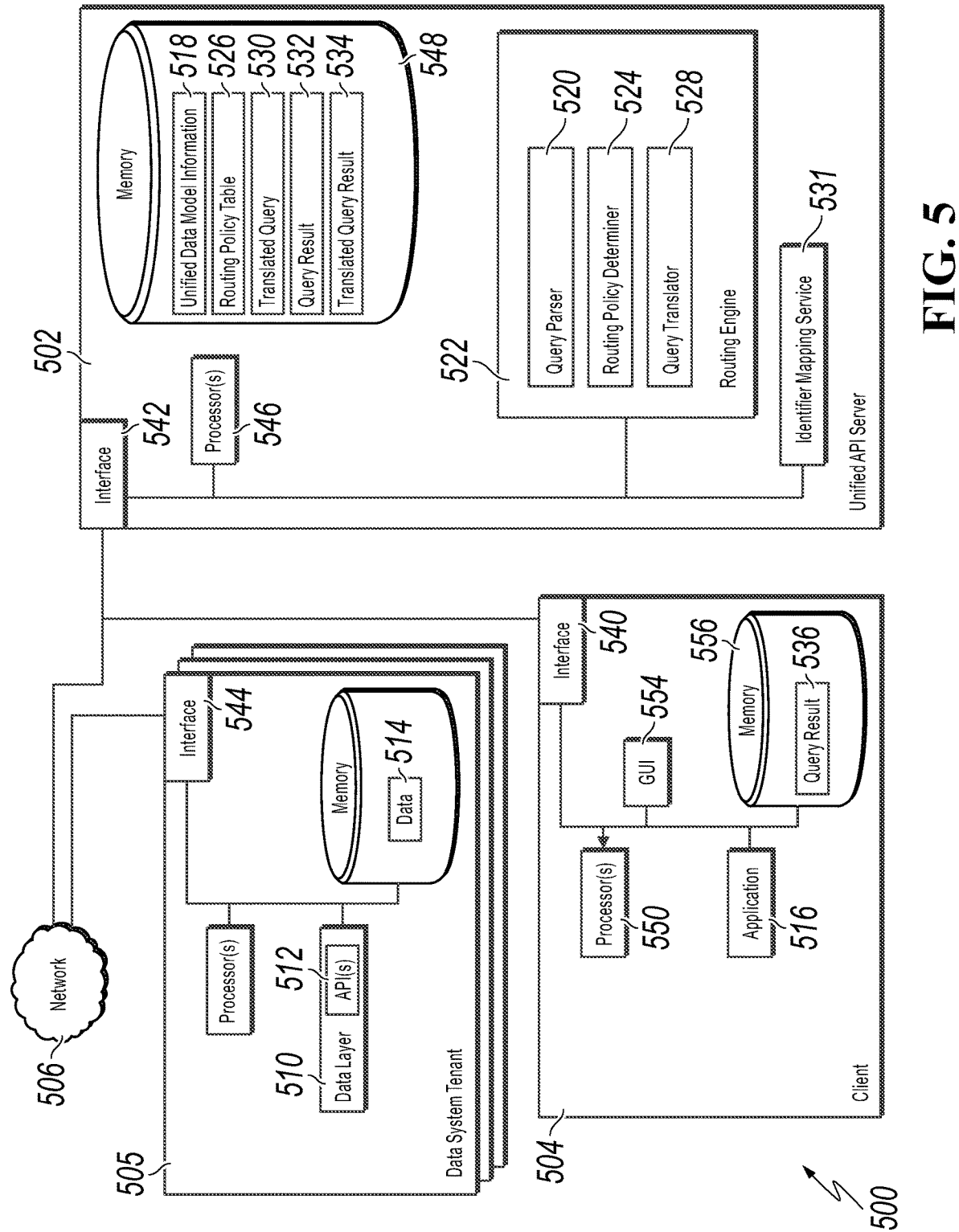
FIG. 5 is a block diagram illustrating an example system for resolving data location for queries in a multi-system instance landscape.

FIG. 5 is a block diagram illustrating an example system 500 for resolving data location for queries in a multi-system instance landscape. Specifically, the illustrated system 500 includes or is communicably coupled with a unified API server 502, a client device 504, one or more data system tenants 505, and a network 506. Although shown separately, in some implementations the functionality of two or more systems or servers may be provided by a single system or server. In some implementations, the functionality of one illustrated system or server may be provided by multiple systems or servers.

Each data system tenant 505 can include a data layer 510 that provides access (e.g., using an API 512) to a data repository 514 stored and/or managed by the data system tenant 505. Different data system tenants 505 can be different tenants of a same type of system, and/or different tenants of different systems (e.g., with different systems being from a same vendor and/or different vendors). Different data repositories 514 can store different sets of data, at least some of the same data as other data repositories, semantically equivalent but differently formatted data, and/or same or similar data but with different identifiers than other data repositories. Data system tenants 505 can be on-premise systems or can be cloud-based systems.

The client device 505 can include a client application 516 that can submit queries for data. While the client application 516 can be coded to directly access one or more of the data system tenants 505, the client application 516 is instead coded to access the unified API server 502 when submitting a data request. For example, the client application 516 can submit a request for data for one or more entities to the unified API server 502.

The request for data can include one or more qualified identifiers that each include a local identifier and a system tenant prefix (or other type of qualifier) corresponding to a particular data system tenant 505. The local identifier identifies an entity instance in the context of the particular data system tenant 505, as described in more detail below. The request for data can be expressed using a unified data model corresponding to unified data model information 518 stored in (or at least known by) the unified API server 502. The unified data model represents commonality of respective data models used in different data repositories 514 in different data system tenants 505.

A query parser 520 in a routing engine 522 can parse the request for data from the client application and identify one or more portions that include a qualified identifier and correspond to a request for data for a particular entity. Each request for data for a particular entity (e.g., each entity data request) can be processed as described below. For instance, a routing policy determiner 524 can access a routing table 526 to determine a routing policy for the entity data request by locating a cell in the routing policy table 526 corresponding to the entity and the qualified identifier in the entity data request. Determining a routing policy can include determining a target system tenant to which to route the entity data request. The target system might or might not be the same system tenant corresponding to the system tenant prefix, for example.

As described in more detail below, routing policies can include a lead system routing policy, in which the system tenant prefix refers to a lead system and the routing policy specifies that the entity data request is to be sent to the lead system. As another example, a local reference policy can indicate that data can be retrieved from a local reliable replica in the system tenant using a local reference. For instance, a system tenant might first query for a customer order and receive a response that includes product identifiers of ordered products. The product identifiers can be considered local references if the product identifiers can be used (e.g., after stripping off a system tenant prefix) to retrieve product data locally in the same system tenant. Other routing policies can indicate that a data request is to be sent to a different system tenant other than that specified by the system tenant prefix, and that identifier mapping might or might not need to be performed between the system specified by the system tenant prefix and the other data system tenant.

A query translator 528 can translate the entity data request from the unified model into a translated query 530 that uses a target data model of the target system tenant. Translating the entity data request into the translated query 530 can include removing the system tenant prefix from the qualified identifier and performing other translations, such as mapping entity names, field names, or other corresponding aspects between the unified model and the data model used by the target system tenant. If the routing policy indicates that identifier mapping is to be performed, the query translator can perform the identifier mapping or can submit a mapping request to an identifier mapping service 531. Although shown as included in the unified API server 502, the identifier mapping service 531 can be provided by another server.

The routing engine 522 can provide the translated query 530 to the target system tenant (e.g., a particular data system tenant 505), for instance, using a particular API 512 provided by the target system tenant. The target system tenant can execute the received translated query, generate a query result, and provide the query result to the unified API server 502 (e.g., as a query result 532).

The query translator 528 can translate the query result 532 from the data model of the target system tenant into a translated query result 534 that uses the unified data model. For instance, target system tenant data model entity and/or field names can be mapped to corresponding unified model entity and/or field names, respectively. Additionally, system tenant prefixes can be prepended to any entity or reference identifiers included in the query result 532, to generate qualified identifiers in the translated query result 534. The translated query result 534 can be provided to the client device 502 and received by the client device 502 as a query result 536. The client application 516 can extract qualified identifier(s) from the query result 536, for use in submitting additional or other entity data requests to the unified API server 502, for example.

As used in the present disclosure, the term "computer" is intended to encompass any suitable processing device. For example, although FIG. 5 illustrates a single unified API server 502 and a single client device 504, the system 500 can be implemented using two or more servers 502, or two or more client devices 504. Indeed, the unified API server 502, the data system tenants 505, and the client device 504 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the unified API server 502 and the client device 504 may be adapted to execute any operating system, including Linux, UNIX, Windows, Mac OS®, Java™, Android™ iOS or any other suitable operating system. According to one implementation, the unified API server 502 may also include or be communicably coupled with an e-mail server, a Web server, a caching server, a streaming data server, and/or other suitable server.

Interfaces 540, 542, and 544 can be used by the client device 504, the unified API server 502, and each data system tenant 505, respectively, for communicating with other systems in a distributed environment—including within the system 500—connected to the network 506. Generally, the interfaces 540, 542, and 544 each comprise logic encoded in software and/or hardware in a suitable combination and operable to communicate with the network 506. More specifically, the interfaces 540, 542, and 544 may each comprise software supporting one or more communication protocols associated with communications such that the network 506 or interface's hardware is operable to communicate physical signals within and outside of the illustrated system 500.

The unified API server 502 includes one or more processors 546. Each processor 546 may be a central processing unit (CPU), a blade, an application specific integrated circuit (ASIC), a field-programmable gate array (FPGA), or another suitable component. Generally, each processor 546 executes instructions and manipulates data to perform the operations of the unified API server 502. For example, each processor 546 executes the functionality required to receive and respond to requests from the client device 504, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 5 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The unified API server 502 includes memory 548. In some implementations, the unified API server 502 includes multiple memories. The memory 548 may include any type of memory or database module and may take the form of volatile and/or non-volatile memory including, without limitation, magnetic media, optical media, random access memory (RAM), read-only memory (ROM), removable media, or any other suitable local or remote memory component. The memory 548 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the unified API server 502.

The client device 504 may generally be any computing device operable to connect to or communicate with the platform unified API server 502 via the network 506 using a wireline or wireless connection. In general, the client device 504 comprises an electronic computer device operable to receive, transmit, process, and store any appropriate data associated with the system 500 of FIG. 5. The client device 504 can include one or more client applications, including the client application 516. A client application is any type of application that allows the client device 504 to request and view content on the client device 504. In some implementations, a client application can use parameters, metadata, and other information received at launch to access a particular set of data from the unified API server 502. In some instances, a client application may be an agent or client-side version of the one or more enterprise applications running on an enterprise server (not shown).

The client device 504 further includes one or more processors 550. Each processor 550 included in the client device 504 may be a central processing unit (CPU), an application specific integrated circuit (ASIC), a field-programmable gate array (FPGA), or another suitable component. Generally, each processor 550 included in the client device 504 executes instructions and manipulates data to perform the operations of the client device 504. Specifically, each processor 550 included in the client device 504 executes the functionality required to send requests to the unified API server 502 and to receive and process responses from the unified API server 502.

The client device 504 is generally intended to encompass any client computing device such as a laptop/notebook computer, wireless data port, smart phone, personal data assistant (PDA), tablet computing device, one or more processors within these devices, or any other suitable processing device. For example, the client device 504 may comprise a computer that includes an input device, such as a keypad, touch screen, or other device that can accept user information, and an output device that conveys information associated with the operation of the unified API server 502, or the client device 504 itself, including digital data, visual information, or a GUI 554.

The GUI 554 of the client device 504 interfaces with at least a portion of the system 500 for any suitable purpose, including generating a visual representation of the client application 516. In particular, the GUI 554 may be used to view various Web pages or other user interfaces. Generally, the GUI 554 provides the user with an efficient and user-friendly presentation of business data provided by or communicated within the system. The GUI 554 may comprise a plurality of customizable frames or views having interactive fields, pull-down lists, and buttons operated by the user. The GUI 554 contemplates any suitable graphical user interface, such as a combination of a generic web browser, intelligent engine, and command line interface (CLI) that processes information and efficiently presents the results to the user visually.

Memory 556 included in the client device 504 may include any memory or database module and may take the form of volatile or non-volatile memory including, without limitation, magnetic media, optical media, random access memory (RAM), read-only memory (ROM), removable media, or any other suitable local or remote memory component. The memory 556 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 504.

There may be any number of client devices 504 associated with, or external to, the system 500. For example, while the illustrated system 500 includes one client device 504, alternative implementations of the system 500 may include multiple client devices 504 communicably coupled to the unified API server 502 and/or the network 506, or any other number suitable to the purposes of the system 500. Additionally, there may also be one or more additional client devices 504 external to the illustrated portion of system 500 that are capable of interacting with the system 500 via the network 506. Further, the term "client", "client device" and "user" may be used interchangeably as appropriate without departing from the scope of this disclosure. Moreover, while the client device 504 is described in terms of being used by a single user, this disclosure contemplates that many users may use one computer, or that one user may use multiple computers.

Figure 6:
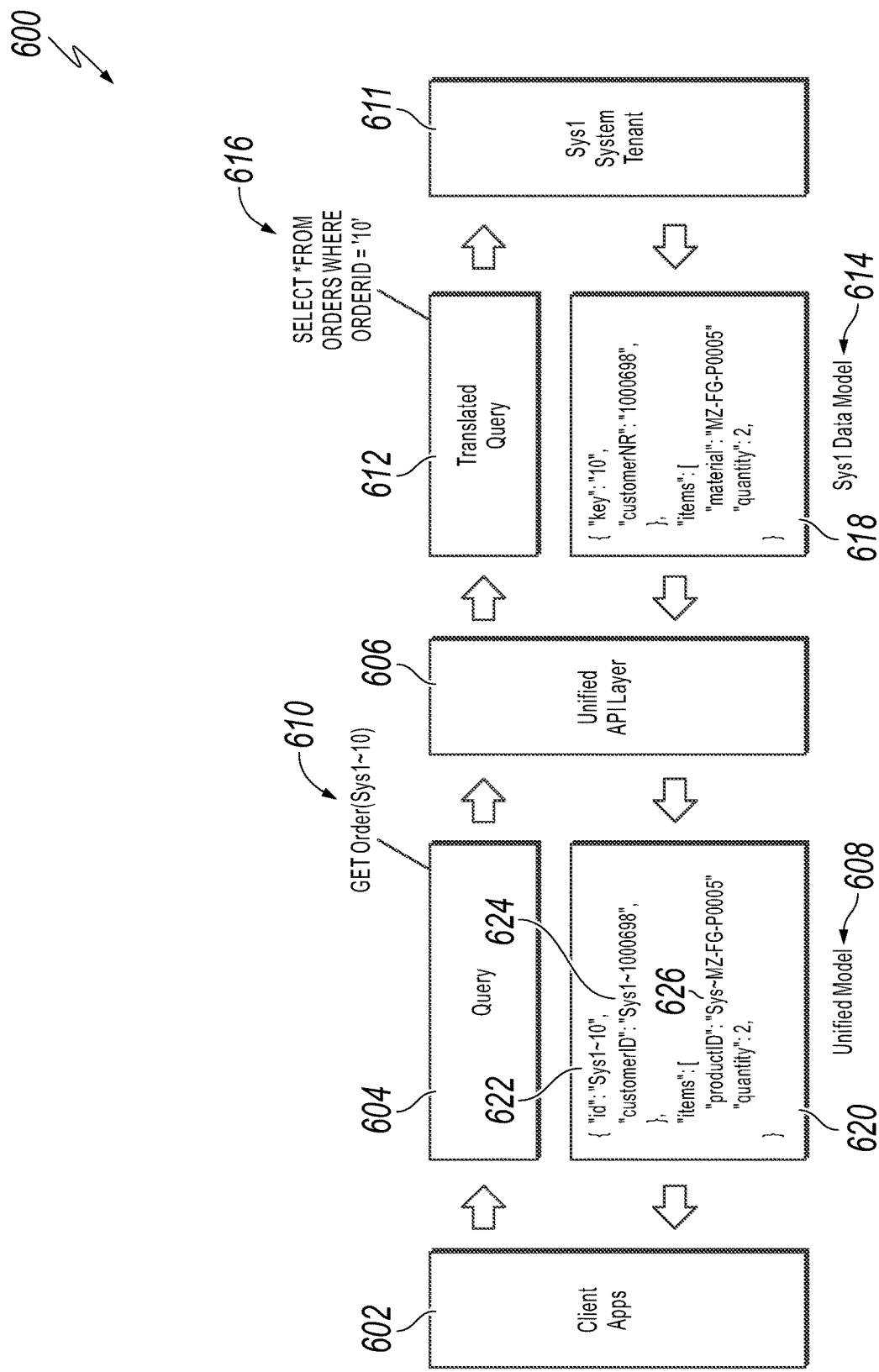
FIG. 6 illustrates an example system that uses qualified identifiers.

FIG. 6 illustrates an example system 600 that uses qualified identifiers. A client application 602 can send a query 604 to a unified API layer 606. The query 604 can be expressed using a unified model 608 and can be sent to the unified API layer using a unified API.

The query 604 includes a qualified identifier 610. In general, a qualified identifier can be a global identifier that is globally unique within a given entity type that is used with a unified model 610 used by the client application 602 when interfacing with the unified API layer 606. A qualified identifier includes a local identifier (e.g., "10" in the qualified identifier 610) that indicates a local identifier provided by a particular system tenant. A system tenant prefix (e.g., "Sys1" in the qualified identifier 610) indicates which system tenant provided the local identifier. In other words, a qualified identifier with a pattern of "SysX~idValue" means that in a context of a "SysX" system tenant, the identifier value for an entity instance is "idValue" (e.g., "idValue" is a local identifier in SysX to the entity instance). Local identifiers and system tenant prefixes can be separate by a tilde character (—) or some other separator. Although prefixes are described, other annotations can be used, such as postfix, infix, or some other type of annotation.

The query 604 can be received by the unified API layer 606. The unified API layer 606 is a middleware layer between consumers of the unified model 608 (and unified API) and system tenants in a multiple-system tenant landscape. As described in more detail below, the unified API layer 606 can use a routing policy to determine which system tenant is a target system tenant from which to request data in response to the query 604.

The target system tenant may, depending on the determined routing policy, correspond to the system tenant prefix in the qualified identifier 610, or may be a different system tenant. In this example, the target system tenant is a Sys1 system tenant 611. The unified API layer 606 can translate the query 604 into a translated query 612 that uses a data model 614 used by the target system tenant (e.g., the Sys1 system tenant 611).

The unified API layer 606 can perform various translations when translating the query 604 to the translated query 612. The system tenant prefix in the qualified identifier 610 is generally not needed (nor understood) by the system tenant 611, so the unified API layer 606 can remove (e.g., strip off) the system tenant prefix and only include the local identifier portion of the qualified identifier 610 in the translated query 612 (as illustrated by a local identifier value '10' 616 included in the translated query 612).

Creating the translated query 612 can also include converting the query from a unified API (e.g., a GET command) to an API or query language used by the system tenant 611 (e.g., a SELECT statement). Additionally, entity names and/or field names can be converted from those used for the unified model 608 to semantically-corresponding entity or field names used in the data model 614 used by the system tenant 611. For instance, an Order entity name in the query 604 has been converted to an Orders entity name in the translated query 612. As described in more detail below, the unified API layer 606 can also determine whether identifier mapping is to be performed, and to perform (or request) identifier mapping as needed (for example, when the target system tenant does not correspond to the system tenant prefix provided in the query 604).

The system tenant 611 can receive and execute the translated query 612. The system tenant 611 can generate a query result 618 and provide the query result 618 to the unified API layer 606, in response to the translated query 612. The query result 618 includes local identifiers that have a context of the system tenant 611 (e.g., the query result 618 does not include qualified identifiers).

The unified API layer 606 can receive and translate the query result 618. For example, the unified API layer 606 can generate a translated query result 620 by prepending a system tenant prefix to each entity or association identifier included in the query result 618. For instance, the unified API layer 606 has included a "Sys1" system tenant prefix in identifiers 622, 624, and 626. The system tenant 611 is unaware of the added system tenant prefixes. The qualified identifiers included in the query result 620 can later be provided to the unified API layer 606, such as in a subsequent request. The unified API layer 606 can use the identifiers 622, 624, and/or 626 for future routing decisions, for example.

Using qualified identifiers for routing can provide numerous advantages. For example, qualified identifiers require no changes for system tenants. System tenants can continue to use a same identifier scheme and identifier ranges. Enabling system tenants to be used unchanged can be advantageous and less costly as compared to modifying each system tenant to include and know some other type of global identifier scheme. System tenants can remain oblivious of the use of qualified identifiers. Introducing qualified identifiers can be fully backward-compatible with customer system tenants and landscapes, with no disruptive data migration required. The qualified identifier solution is a robust solution, even in light of potential landscape changes. For instance, a new system tenant, like existing system tenants, need not be aware of the use of qualified identifiers.

From a client application perspective, the qualified identifiers received and used by the client application can serve as globally unique identifiers within the customer landscape. Clients can receive and use identifiers and references as opaque strings of data, without necessarily being aware of the system tenant prefixes included in the identifiers. Implementing qualified identifiers, specifically insertion and removal of system tenant prefixes, can be done inline with minimal effort by the unified API layer 606.

FIG. 7 illustrates an example routing policy table 700. A routing policy can be based on an entity type, a source system of an entity identifier reference, and whether the identifier reference is to be identifier-mapped before being used. The routing policy table 700 can include a cell for each entity and system tenant combination in a system landscape. Each cell can have a value corresponding to a particular type of routing policy for the entity and system tenant combination, as described in a descriptive table 702. Routing policies can be implemented by a routing engine. Routing policies can be identified using codes, for example.

For instance, routing policies can include a lead system ("LS") policy 704 that indicates that the system tenant is a lead system (e.g., lead system tenant) for the entity. Even if data for the entity exists in other systems, data for the entity can be retrieved from the lead system tenant. Data for the entity in other system tenants other than the lead system tenant can be determined to be copies of the entity data. The routing engine can retrieve the data for the entity from the lead system tenant using a local identifier stored in the lead system tenant.

A local reference routing policy ("L") 706 can indicate that the entity is fully replicated in the system tenant and that the routing engine can retrieve the data for the entity from the system tenant using a local identifier for the entity stored in the system tenant. The replica can be considered to be a reliable copy and can therefore be used to retrieve entity data.

A cross reference routing policy ("X") 708 can indicate that the system tenant does not have a local replica copy of the entity and that references to the entity can be assumed to correspond to the lead system tenant (and not this system tenant). The routing engine can retrieve data for the entity from the lead system tenant, using a local identifier stored in the system tenant. References from the system tenant to the entity refer to entity data in the lead system but need not be identifier mapped.

A cross reference after mapping routing policy ("XM") 710 corresponds to situations in which identifier mapping is performed. The routing policy XM can indicate that the system tenant has a local copy of the entity but the local copy may be inadequate/unreliable so that data can instead be retrieved from the lead system tenant. A local identifier in the system tenant can be mapped, using an identifier mapping (IDM) service, to a corresponding identifier of the lead system tenant. The routing engine can use the identifier of the lead system tenant to retrieve data for the entity from the lead system tenant.

Each service provider customer (e.g., a customer administrator) can provide information for completion of a routing policy table for the customer, based on the particular system tenants that are included in the landscape of the customer. The service provider can provide various means for generation of a routing policy table for the customer. For example, a customer administrator or developer can provide information to a service provider administrator or developer. As another example, the service provider can provide a user interface for entering information by a customer that can be used to generate a routing policy table for the customer. As yet another example, the service provider can populate an initial routing policy table for the customer and enable the customer to customize the initial routing policy table as needed. The routing policy table for a customer can be used as an input to a routing policy algorithm.

Figure 8:
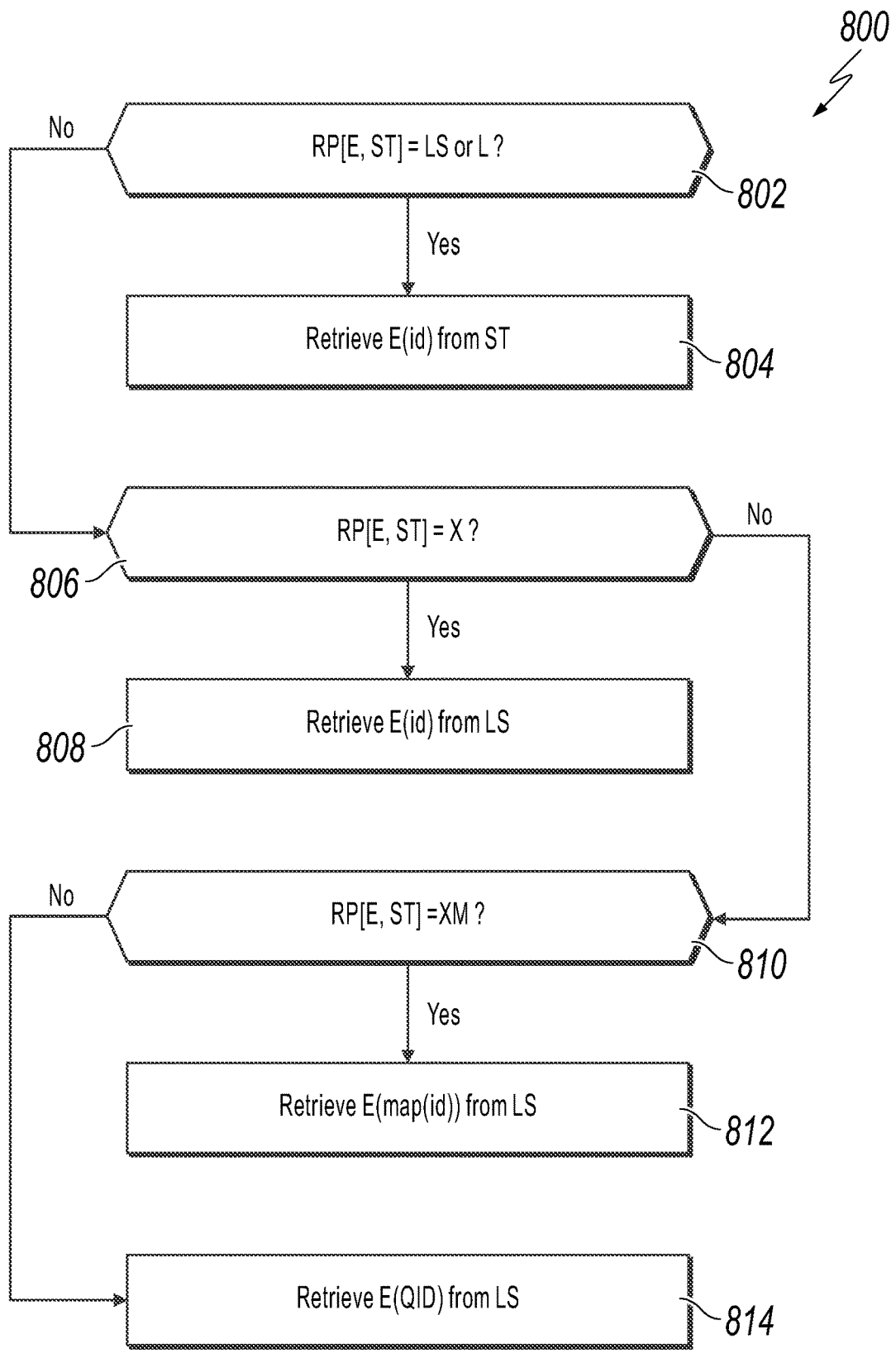
FIG. 8 illustrates an example routing policy algorithm.

FIG. 8 illustrates an example routing policy algorithm 800. The routing policy algorithm 800 can use a routing policy (RP) table as input. A routing engine can perform the routing policy algorithm 800 to determine whether a given system tenant (ST) is to be used to retrieve data for an entity (E) when a query for an entity is received that includes a qualified identifier (QID) for the system tenant (e.g., ST~id). At 802, a determination is made as to whether the routing policy table cell for the system tenant and the entity indicates a LS (lead system) or L (local reference) routing policy. At 804, in response to determining that the routing policy table cell for the system tenant and the entity indicates a LS or L routing policy, data for the entity is retrieved from the system tenant ST using the local identifier portion (id) of the qualified identifier.

At 806, in response to determining that the routing policy table cell for the system tenant and the entity does not indicate a LS or L routing policy, a determination is made as to whether the routing policy table cell for the system tenant and the entity indicates a cross reference (X) routing policy. At 808, in response to determining that the routing policy table cell for the system tenant and the entity indicates an X routing policy, data for the entity is retrieved from the lead system tenant LS (rather than the system tenant ST) using the identifier portion (id) of the qualified identifier.

At 810, in response to determining that the routing policy table cell for the system tenant and the entity does not indicate an X routing policy, a determination is made as to whether the routing policy table cell for the system tenant and the entity indicates a cross reference after mapping (XM) routing policy. At 812, in response to determining that the routing policy table cell for the system tenant and the entity indicates an XM routing policy, the identifier portion (id) of the qualified identifier is mapped, using an identifier mapping service, from the system tenant ST to the lead system LS. Data for the entity is then retrieved from the lead system tenant LS (rather than the system tenant ST) using the mapped identifier.

At 814, in response to determining that the routing policy table cell for the system tenant and the entity does not indicate an XM routing policy, a routing engine can assume that the qualified identifier actually does not include both a system tenant prefix portion and an identifier portion, but rather may be treated as an unprefixed identifier that can be used to query the lead system. Accordingly, data for the entity can be retrieved from the lead system using the full qualified identifier.

FIG. 9 illustrates an example routing policy table 900. The routing policy table 900 includes rows 902, 904, 906, and 908 for CustomerQuote, Customer, Product, and SalesOrganization entities, respectively. The routing policy table 900 includes columns 910, 912, and 914 for Sys1, Sys2, and Sys3 system tenants, respectively. An explanation column 916 includes a summary description of a set of configurations for each entity.

For example, the configurations in the row 902 include an LS setting 918 indicating that Sys2 is a lead system tenant for the CustomerQuote entity. Cross-reference ("X") settings 920 and 922 for the remaining Sys1 and Sys3 system tenants, respectively, indicate that customer quote data is not replicated to other systems. Similarly, the configurations in the row 908 include an LS setting 924 indicating that Sys1 is a lead system tenant for the SalesOrganization entity. Cross-reference ("X") settings 926 and 928 for the remaining Sys2 and Sys3 system tenants, respectively, indicate that sales organization data is not replicated to other systems.

Configurations in the row 904 include an LS setting 930 indicating that Sys1 is a lead system tenant for the Customer entity. Local-reference ("L") settings 932 and 934 indicate that customer data is replicated to the Sys2 and Sys3 system tenants, respectively (and that local copies can be used when responding to queries for customer data).

Configurations in the row 906 include an LS setting 936 indicating that Sys3 is a lead system tenant for the Product entity. Cross reference after mapping ("XM") settings 938 and 840 indicate that product data is replicated in the Sys1 and Sys2 system tenants, but that local identifiers in replicated data need to be mapped to identifiers used in the Sys3 lead system tenant. The example routing policy table 900 and its included settings are used in routing policy decisions, as described in the swim lane figures below with respect to FIGS. 10-13.

Figure 10:
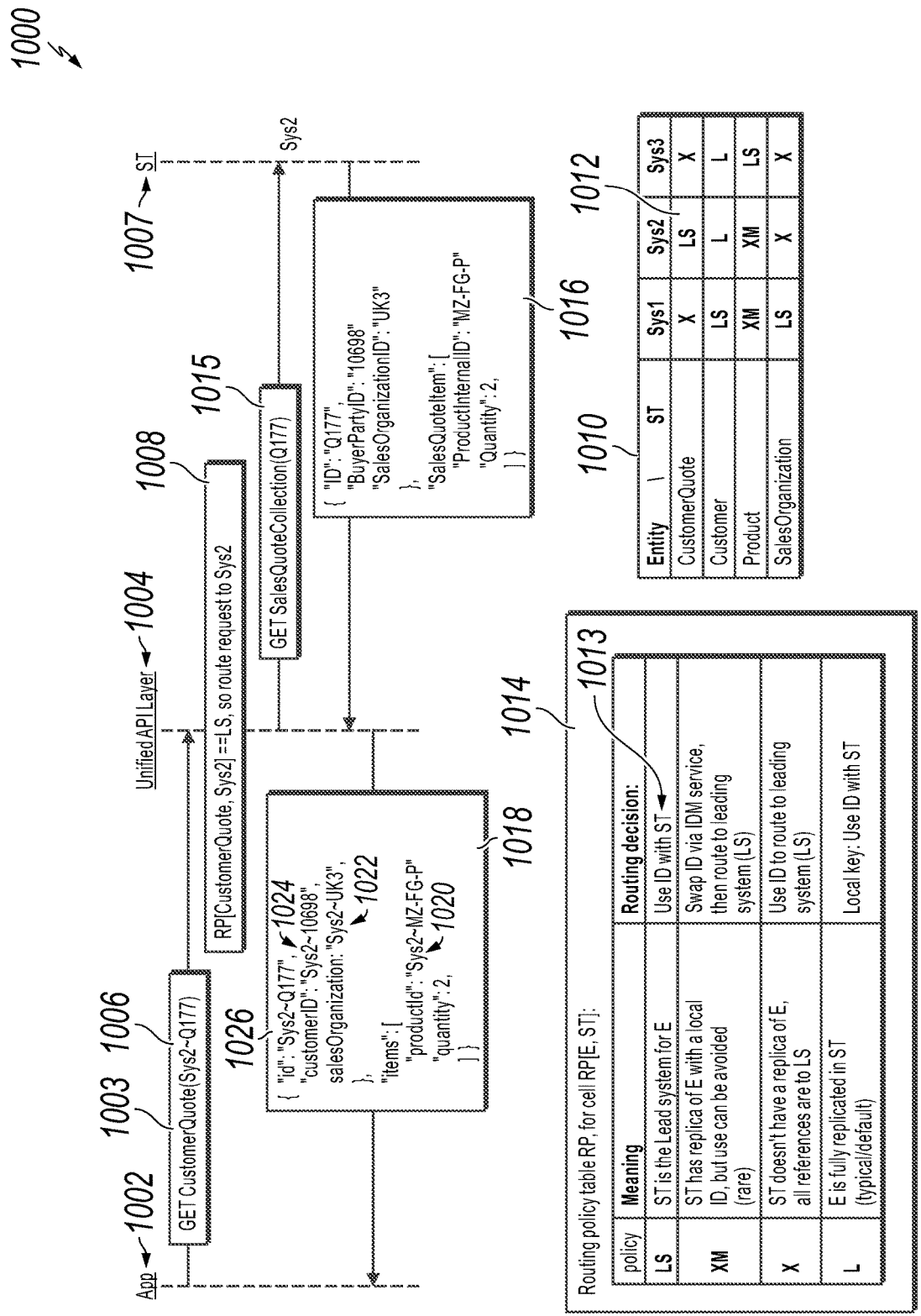
FIG. 10 illustrates an example swim lane diagram for a first example routing scenario.

FIG. 10 illustrates an example swim lane diagram 1000 for a first example routing scenario. The first example routing scenario uses the routing policy table described above with respect to FIG. 9 and described in more detail below. A client application 1002 submits a query 1003 to a unified API layer 1004. The query 1003 corresponds to a request to retrieve a customer quote associated with a "Sys2~Q177" qualified identifier 1006. The qualified identifier 1006 includes a system prefix for a Sys2 system tenant 1007 and a local identifier of "Q177".

As indicated by a processing block 1008, a routing engine in the unified API layer 1004 can reference a routing policy table 1010 to determine how to route the query 1003. For instance, the routing engine can locate a cell 1012 in the routing policy table 1010 that corresponds to the CustomerQuote entity and the Sys2 system tenant. An "LS" value in the cell 1012 indicates that the Sys2 system tenant is a lead system for the CustomerQuote entity. The other system tenants for the CustomerQuote entity are marked as "X", for cross reference, since A cell 1013 in a routing description table 1014 indicates that when a system tenant is the lead system, the local identifier in the query is to be used to query the system tenant. Accordingly, to handle the query 1003, the unified API layer 1004 submits a translated query 1015 to the Sys2 system tenant 1007. The translated query 1015 includes the local identifier portion of the qualified identifier 1006, rather than the entire qualified identifier.

The Sys2 system tenant 1007 executes the translated query 1015 and returns a query result 1016 to the unified API layer 1004. The query result 1016 includes customer quote information retrieved from the Sys2 system tenant 1007 that corresponds to the Q177 local identifier. The unified API layer 1004 can process the query result 1016 to create a transformed query result 1018. The unified API layer 1004 can provide the transformed query result 1018 to the client application 1002 in response to the query 1003. When generating the transformed query result 1018, the unified API layer 1004 can prepend a system tenant prefix to each identifier included in the query result 1016, to create qualified identifiers. For example, the transformed query result 1018 includes qualified identifiers 1020, 1022, 1024, and 1026. The qualified identifier 1026 corresponds to the qualified identifier 1006 provided by the client application in the query 1003. The qualified identifiers 1020, 1022, and 1024, which each include a system tenant prefix and an association identifier, can be used by the client application 1002 in further queries, as described below.

Figure 11:
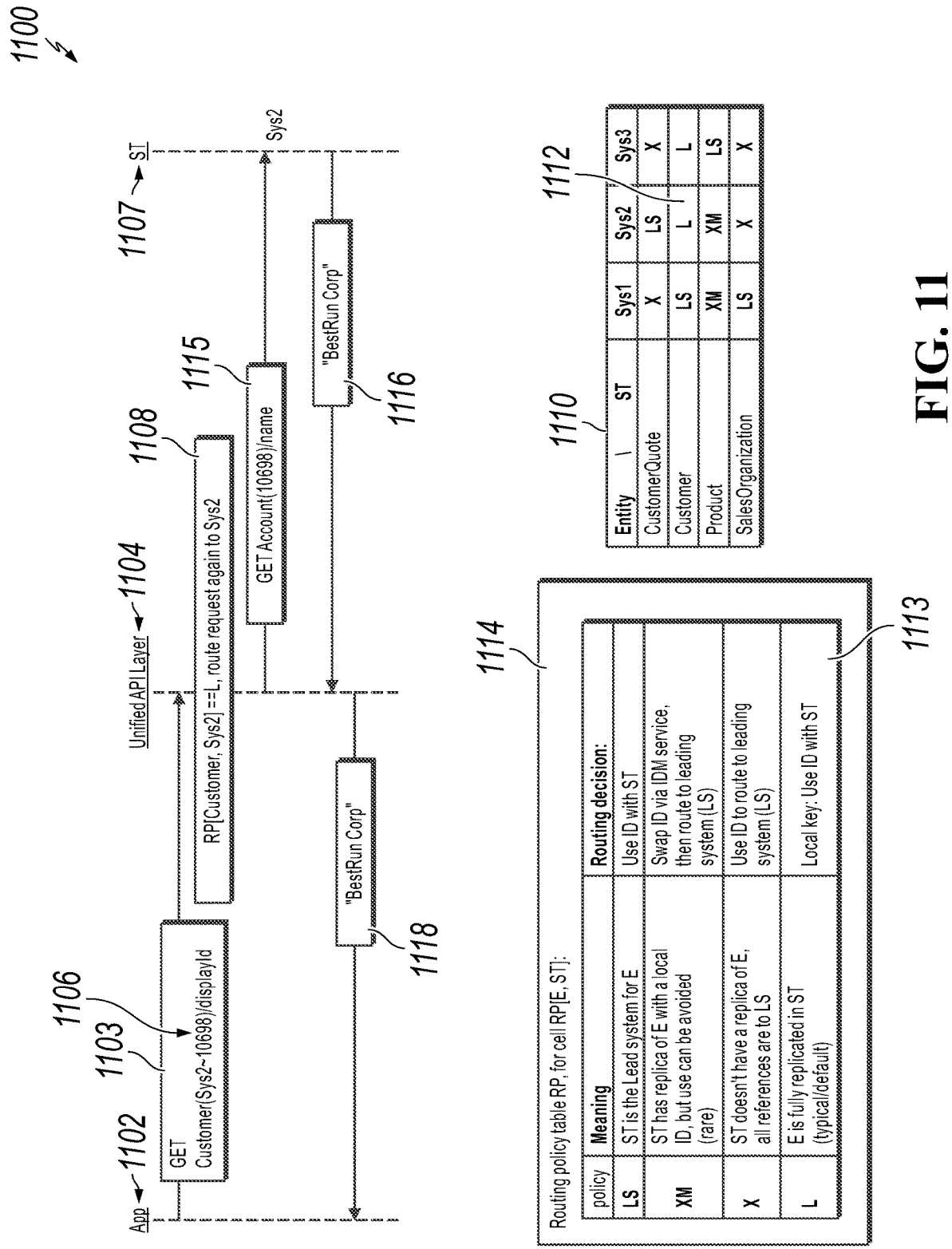
FIG. 11 illustrates an example swim lane diagram for a second example routing scenario.

FIG. 11 illustrates an example swim lane diagram 1100 for a second example routing scenario. The second example routing scenario uses the routing policy table described above with respect to FIG. 9 and described in more detail below. A client application 1102 submits a query 1103 to a unified API layer 1104. The query 1103 corresponds to a request to retrieve a display identifier of a customer associated with a "Sys2~10698" qualified identifier 1106. The qualified identifier 1106 includes a system prefix for a Sys2 system tenant 1107 and a local identifier of 10698. The qualified identifier 1106 can correspond to a value received by the client application 1102 in response to a previous query.

As indicated by a processing block 1108, a routing engine in the unified API layer 1104 can reference a routing policy table 1110 to determine how to route the query 1103. For instance, the routing engine can locate a cell 1112 in the routing policy table 1110 that corresponds to the Customer entity and the Sys2 system tenant. An "L" value in the cell 1112 indicates that the Sys2 system tenant 1007 includes local references for reliable replicas of the Customer entity. A cell 1113 in a routing description table 1114 indicates that when a system tenant includes local references for a reliable replica, the local identifier in the query can still be used to query the system tenant. Accordingly, to handle the query 1103, the unified API layer 1104 submits a translated query 1115 to the Sys2 system tenant 1107. The translated query 1115 includes the local identifier portion of the qualified identifier 1106, rather than the entire qualified identifier. The translated query 1115 also includes a local field name of "name" which corresponds to a unified model field of "displayId" in the query 1103. The unified API layer 1104 can determine appropriate mapping of unified model field names to specific system tenant field names, for example.

The Sys2 system tenant 1107 executes the translated query 1115 and returns a query result 1116 to the unified API layer 1104 that includes the requested customer name/display identifier. The query result 1116 does not include any entity or related-entity instance identifiers, so no identifier prefixes are required when the unified API layer 1104 forwards the query result 116 to the client application 1102 as a forwarded query result 1118.

Figure 12:
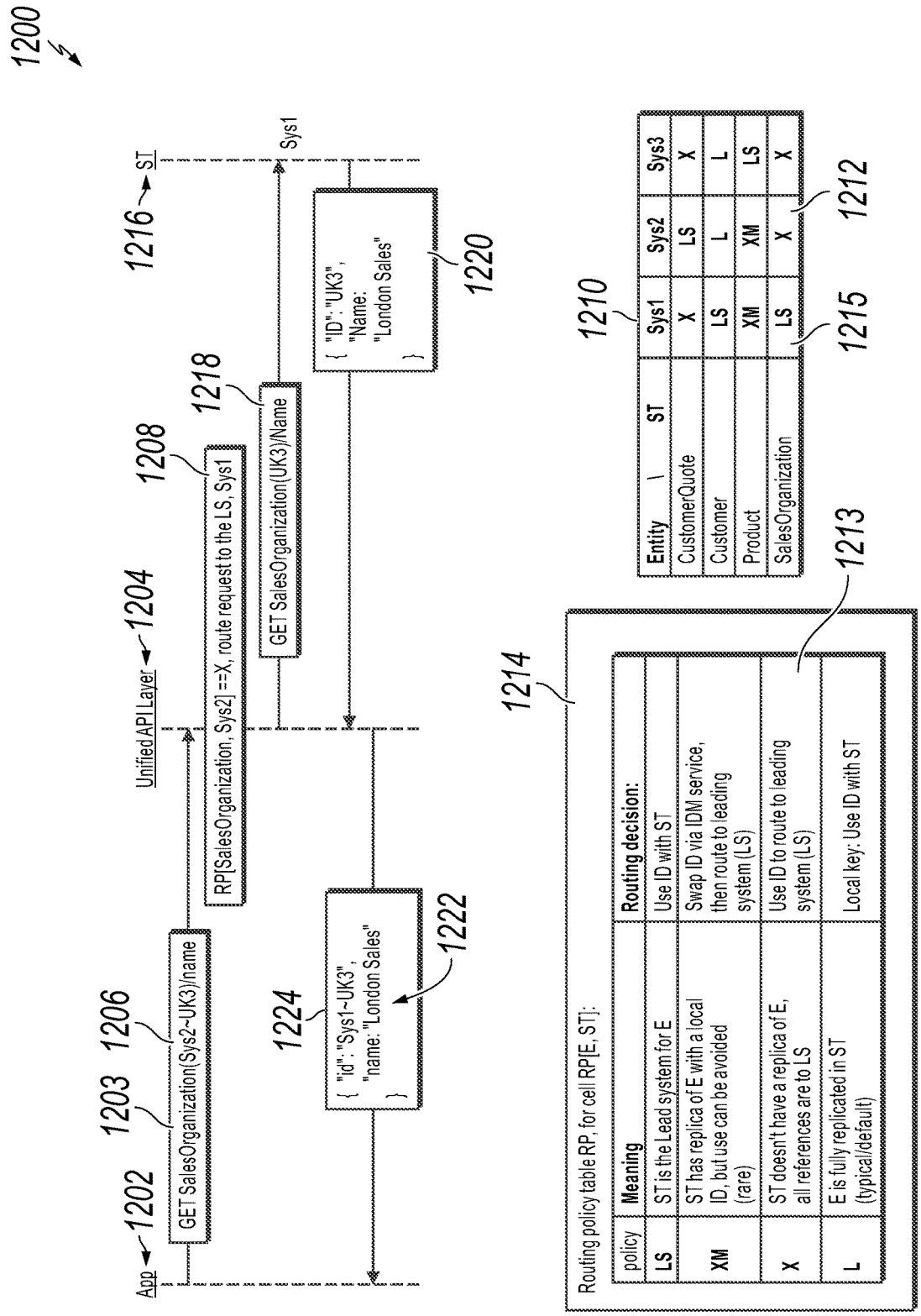
FIG. 12 illustrates an example swim lane diagram for a third example routing scenario.

FIG. 12 illustrates an example swim lane diagram 1200 for a third example routing scenario. The third example routing scenario uses the routing policy table described above with respect to FIG. 9 and described in more detail below. A client application 1202 submits a query 1203 to a unified API layer 1204. The query 1203 corresponds to a request to retrieve a name of a sales organization corresponding to a "Sys2~UK3" qualified identifier 1206. The qualified identifier 1206 includes a system prefix for a Sys2 system tenant and a local identifier of "UK3". The qualified identifier 1206 can correspond to a value received by the client application 1202 in response to a previous query.

As indicated by a processing block 1208, a routing engine in the unified API layer 1204 can reference a routing policy table 1210 to determine how to route the query 1203. For instance, the routing engine can locate a cell 1212 in the routing policy table 1210 that corresponds to the SalesOrganization entity and the Sys2 system tenant. An "X" value in the cell 1212 indicates that a routing policy for a qualified identifier for the Sys2 system tenant and the SalesOrganization entity is a cross reference policy. A cell 1213 in a routing description table 1214 indicates that for a cross reference policy, the local identifier in the qualified identifier 1206 can be used to route the query 1203 to a lead system. The system tenant and the lead system may agree on a same identifier range, for example. A cell 1215 in the routing policy table 1210 indicates that a Sys1 system tenant 1216 is a lead system tenant for the SalesOrganization entity. Accordingly, to route the query 1203, the unified API layer 1204 submits a query 1218 to the Sys1 system tenant 1216 (rather than to the Sys2 system tenant referenced in the qualified identifier 1206). The translated query 1218 includes the local identifier portion (UK3) of the qualified identifier 1206, rather than the entire qualified identifier.

The Sys1 system tenant 1216 executes the translated query 1218 and returns a query result 1220 to the unified API layer 1204. The unified API layer 1204 can process the query result 1220 to create a transformed query result 1222. The transformed query result 1222 includes a system tenant prefix 1224 that has been inserted by the unified API layer 1204 in front of the UK3 SalesOrganization instance identifier. The unified API layer 1204 can provide the transformed query result 1222 to the client application 1202 in response to the query 1203. Although the system tenant prefix 1224 of "Sys1", rather than "Sys2" is used, in some examples, the unified API layer 1204 can use a "Sys2" prefix (to correspond to the system tenant prefix in the qualified identifier 1206).

Figure 13:
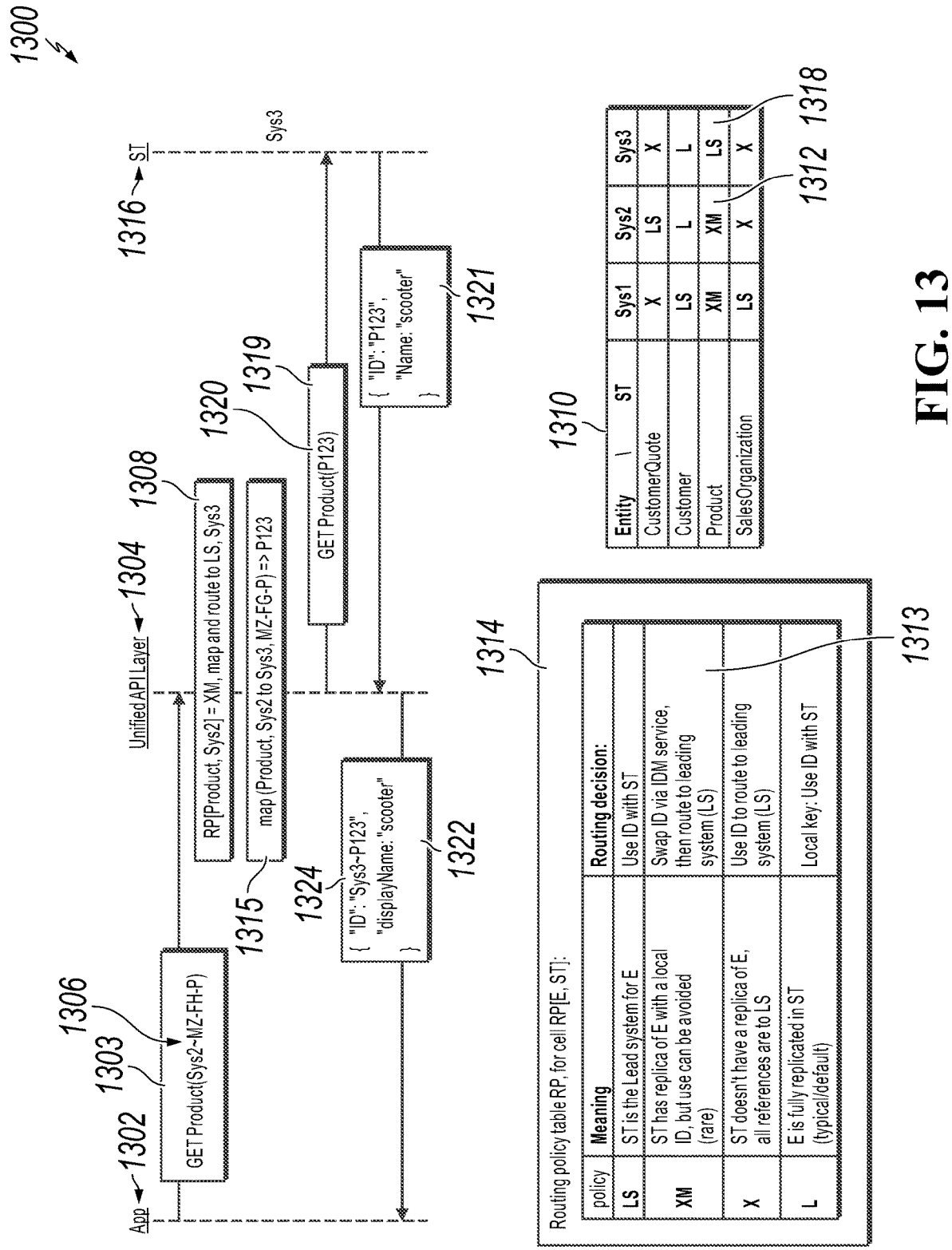
FIG. 13 illustrates an example swim lane diagram for a fourth example routing scenario.

FIG. 13 illustrates an example swim lane diagram 1300 for a third example routing scenario. The third example routing scenario uses the routing policy table described above with respect to FIG. 9 and described in more detail below. A client application 1302 submits a query 1303 to a unified API layer 1304. The query 1303 corresponds to a request to retrieve product information corresponding to a "Sys2~MZ-FG-P" qualified identifier 1306. The qualified identifier 1306 includes a system prefix for a Sys2 system tenant and a local identifier of "MZ-FG-P". The qualified identifier 1306 can correspond to a value received by the client application 1302 in response to a previous query.

As indicated by a processing block 1308, a routing engine in the unified API layer 1304 can reference a routing policy table 1310 to determine how to route the query 1303. For instance, the routing engine can locate a cell 1312 in the routing policy table 1310 that corresponds to the Product entity and the Sys2 system tenant. An "XM" value in the cell 1312 indicates that a routing policy for a qualified identifier for the Sys2 system tenant and the Product entity is a cross reference after mapping policy. According to a cell 1313 in a routing description table 1314 and as illustrated by a processing block 1315, for a cross reference after mapping policy, a local Product instance identifier MZ-FG-P in the Sys2 system tenant is mapped to (e.g., swapped with) a "P123" local Product instance identifier in the lead system tenant Sys3 1316. A cell 1318 in the routing policy table 1310 indicates that the Sys3 system tenant 1316 is the lead system tenant for the Product entity. The Sys2 system tenant may have some product information, but the Sys3 system tenant 1316 has been configured as a source of truth for product information. An identifier-mapping service can be used to determine an appropriate identifier in the Sys3 system tenant 1316. Various types of identifier mapping services can be used.

Accordingly, to route the query 1303, the unified API layer 1304 submits a translated query 1319 to the Sys3 system tenant 1316 (rather than to the Sys2 system tenant referenced in the qualified identifier 1306). The translated query 1319 includes a local Sys3 system tenant Product instance identifier "P123" 1320.

The Sys1 system tenant 1316 executes the translated query 1319 and returns a query result 1321 to the unified API layer 1304. The unified API layer 1304 can process the query result 1321 to create a transformed query result 1322. The transformed query result 1322 includes a system tenant prefix 1324 that has been inserted by the unified API layer 1304 in front of the P123 Product instance identifier. The unified API layer 1304 can provide the transformed query result 1322 to the client application 1302 in response to the query 1303.

Figure 14:
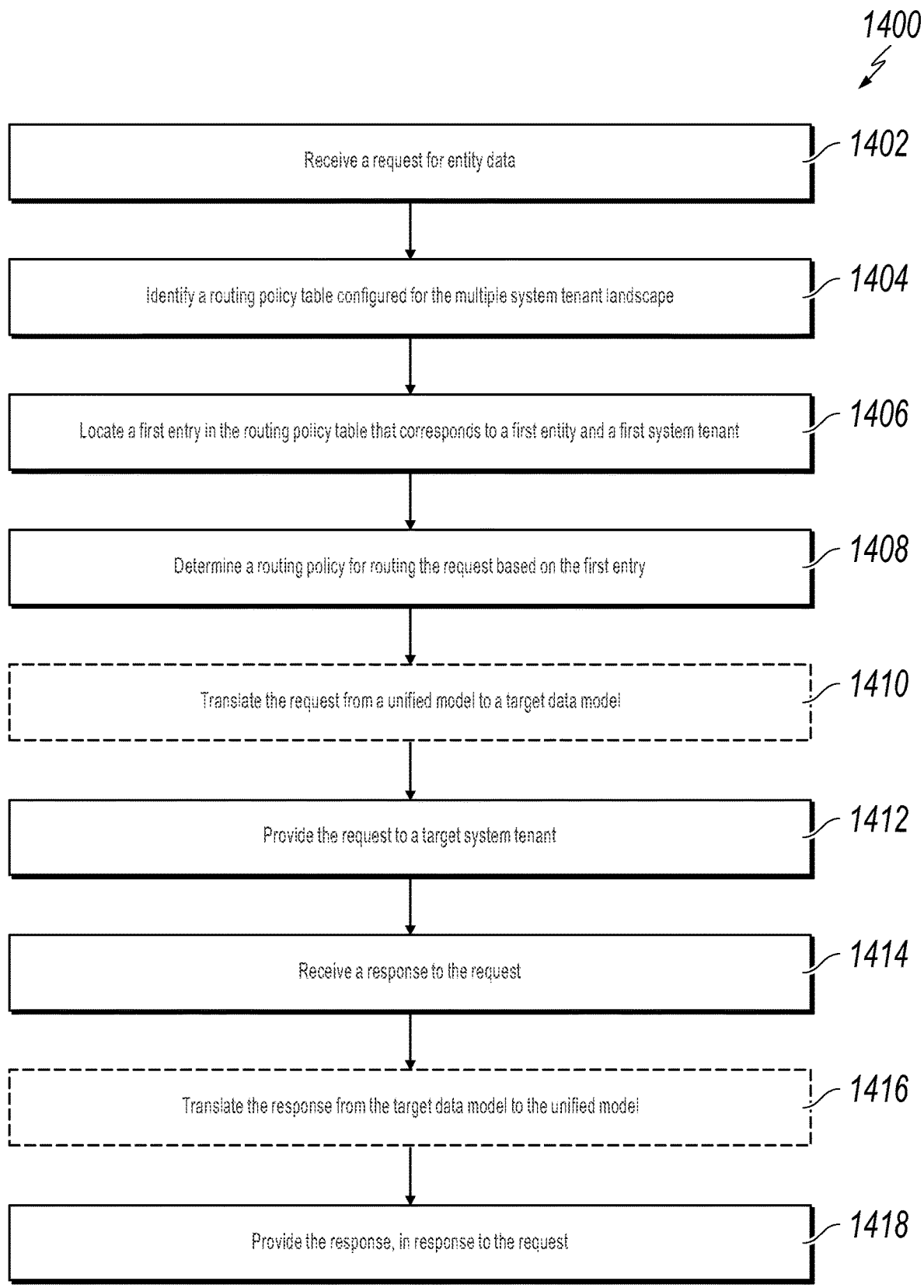
FIG. 14 is a flowchart of an example method for resolving data location for queries in a multi-system instance landscape.

FIG. 14 is a flowchart of an example method 1400 for resolving data location queries in a multi-system instance landscape. It will be understood that method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device. In some implementations, the method 1400 and related methods are executed by one or more components of the system 500 described above with respect to FIG. 5. For example, the method 1400 and related methods can be executed by the routing engine 522 of FIG. 5.

At 1402, a request is received from a client application for data for at least one entity. The request includes a first qualified identifier that includes a first system tenant prefix and a first local identifier. The first system tenant prefix identifies a first system tenant in a multi-system tenant landscape. The first local identifier identifies at least one entity instance of a first entity in at least one system tenant in the landscape. The request is based on a unified data model that represents commonality of respective data models used by multiple system tenants in the multi-system tenant landscape. The request can be sent using a unified API that enables the client application to request data from any of the systems tenants in the multi-system tenant landscape.

At 1404, a routing policy table configured for the multi-system tenant landscape is identified. The routing policy table can be configured, at least in part, using data provided by a customer associated with the multiple-system landscape.

At 1406, a first cell in the routing policy table is located that corresponds to the first entity and the first system tenant. The routing policy table can include, for each entity in the multi-system landscape, a cell for each system tenant in the landscape. The first cell can identify the first system tenant as a lead system tenant that is a source of truth for the first entity. As another example, a different second system tenant can be configured in the routing policy table as the source of truth for the first entity, and the first cell can identify the first system tenant as including a consistent replica of the first entity. Other examples include the first cell identifying the first system tenant as not storing the first entity or the first cell identifying the first system tenant as storing the first entity but not as the source of truth for the first entity and with different identifier values than the source of truth for the first entity.

At 1408, a routing policy is determined for routing the request based on the first cell. Determining the routing policy includes determining a target system tenant to which to route the request. If the first cell identifies the first system tenant as a lead system tenant that is a source of truth for the first entity, determining the routing policy can include determining that the routing policy is a lead system policy and that the first system tenant is the target system tenant. If the first cell identifies the first system tenant as including a consistent replica of the first entity, determining the routing policy can include determining that the routing policy is a local reference policy and that the first system tenant is the target system tenant based on the first system tenant including the consistent replica of the first entity. When the first cell identifies the first system tenant as not storing the first entity, a second cell in the routing system table can be located that identifies a second system tenant as the source of truth for the first entity. Determining the routing policy can include can include determining that the routing policy is a cross reference policy and that the second system tenant is the target system tenant. If the first cell identifies the first system tenant as storing the first entity but not as the source of truth for the first entity and with different identifier values than the source of truth for the first entity, determining the routing policy can include determining that the routing policy is a cross reference after mapping policy and that the second system tenant is the target system tenant that is to receive a mapped entity identifier.

At 1410, as an optional step, the request can be optionally translated from the unified model into a target data model of the target system tenant. If the first cell identifies the first system tenant as storing the first entity but not as the source of truth for the first entity and with different identifier values than the source of truth for the first entity. The first local identifier can be mapped from a first identifier range used by the first system tenant to a second identifier range used by the second system tenant. Translating the request can involve including, in the request, the first local identifier but not the first system tenant prefix. Translating the request can include mapping a name of the first entity to a corresponding entity name in the target data model and including the corresponding entity name in the request. Translating the request can include mapping a field name in the request to a corresponding field name in the target data model and including the corresponding field name in the request.

At 1412, the request is provided to the target system tenant.

At 1414, a response to the request is received from the target system tenant.

At 1416, as an optional step, the response can be translated from the target data model into the unified data model. Translating to the unified model can include adding, in the response, a system tenant prefix corresponding to the target system tenant to entity identifiers and association identifiers included in the response. Translating the response from the target data model into the unified model can include mapping a name of the first entity as known in the target data model to a corresponding entity name in the unified model.

Translating the response from the target data model into the unified model can include mapping a name of a first field as known in the target data model to a corresponding field name in the unified model.

At 1418, the response provided to the client application in response to the request. Although the request is described as for data for a first entity, the request can be for data for more than entity. For instance, multiple sub-requests for entity data can be identified in the request. A routing policy can be determined for each sub-request. Sub-requests can be (optionally) translated to target data models of respective target system tenants and the requests can be provided to the respective target system tenants. Accordingly, responses can be received from the respective target system tenants and (optionally) translated into respective responses in the unified model. The responses from the respective target systems can be provided to the client application in response to the request.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    receiving, from a client application, a request for data for at least one entity, wherein the request includes a first system tenant qualifier that identifies a first system tenant in a multi-system tenant landscape and a first local identifier that identifies an entity instance of a first entity in the first system tenant;
    locating a first cell that corresponds to the first entity and the first system tenant in a routing policy table configured for the multi-system tenant landscape, wherein the first cell identifies a routing policy for routing the request to a target system tenant;
    providing, to the target system tenant, the request, based on the routing policy;
    receiving, from the target system tenant, a response to the request; and
    providing, to the client application and in response to the request, the response.

2. The computer implemented method of claim 1, further comprising:
    before providing the request to the target system, translating the request from a unified model that represents commonality of respective data models used by multiple system tenants into a target data model of the target system tenant; and
    before providing the response to the client application, translating the response from the target data model to the unified model.

3. The computer-implemented method of claim 1, wherein the request is sent using a unified API (Application Programming Interface) that enables the client application to request data from any of the systems tenants in the multi-system tenant landscape.

4. The computer-implemented method of claim 1, wherein:
    the first cell identifies the first system tenant as a lead system tenant that is a source of truth for the first entity;
    the routing policy is a lead system policy that indicates that the first system tenant is the target system tenant; and
    the request is provided to the first system tenant.

5. The computer-implemented method of claim 4, wherein:
    a second system tenant is configured in the routing policy table as the source of truth for the first entity;
    the first cell identifies the first system tenant as including a consistent replica of the first entity;
    the routing policy is a local reference policy that indicates that the first system tenant is the target system tenant based on the first system tenant including the consistent replica of the first entity; and
    the request is provided to the first system tenant.

6. The computer-implemented method of claim 4, wherein:
    the first cell identifies the first system tenant as not storing the first entity;
    the method further comprises locating a second cell in the routing system table that identifies a second system tenant as the source of truth for the first entity;
    the routing policy is a cross reference policy that indicates that the second system tenant is the target system tenant; and
    the request is provided to the second system tenant.

7. The computer-implemented method of claim 4, wherein:
    the first cell identifies the first system tenant as storing the first entity but not as the source of truth for the first entity and with different identifier values than the source of truth for the first entity;
    the method further comprises:
        locating a second cell in the routing system table that identifies a second system tenant as the source of truth for the first entity; and
        mapping the first local identifier from a first identifier range used by the first system tenant to a second identifier range used by the second system tenant;
    the routing policy is a cross reference after mapping policy that indicates that the second system tenant is the target system tenant; and
    the request is provided to the second system tenant.

8. The computer-implemented method of claim 1, wherein translating the request from the unified model into the target data model includes including, in the request, the first local identifier but not the first system tenant qualifier.

9. The computer-implemented method of claim 1, wherein translating the request from the unified model into the target data model includes:
    mapping a name of the first entity to a corresponding entity name in the target data model; and
    replacing, in the request, the name of the first entity with the corresponding entity name.

10. The computer-implemented method of claim 1, wherein translating the request from the unified model into the target data model includes:
- mapping a field name in the request to a corresponding field name in the target data model; and
- replacing, in the request, the field name with the corresponding field name.

11. The computer-implemented method of claim 1, wherein the request is for data for more than entity, the method further comprising:
- identifying, in the request, multiple sub-requests for entity data;
- identifying a routing policy for each sub-request including determining a target system tenant for each sub-request; and
- providing the sub-requests to the respective target system tenants.

12. A system comprising:
- one or more computers; and
- a computer-readable medium coupled to the one or more computers having instructions stored thereon which, when executed by the one or more computers, cause the one or more computers to perform operations comprising:
  - receiving, from a client application, a request for data for at least one entity, wherein the request includes a first system tenant qualifier that identifies a first system tenant in a multi-system tenant landscape and a first local identifier that identifies an entity instance of a first entity in the first system tenant;
  - locating a first cell that corresponds to the first entity and the first system tenant in a routing policy table configured for the multi-system tenant landscape, wherein the first cell identifies a routing policy for routing the request to a target system tenant;
  - providing, to the target system tenant, the request, based on the routing policy;
  - receiving, from the target system tenant, a response to the request; and
  - providing, to the client application and in response to the request, the response.

13. The system of claim 12, wherein the operations further comprise:
- before providing the request to the target system, translating the request from a unified model that represents commonality of respective data models used by multiple system tenants into a target data model of the target system tenant; and
- before providing the response to the client application, translating the response from the target data model to the unified model.

14. The system of claim 12, wherein the request is sent using a unified API (Application Programming Interface) that enables the client application to request data from any of the systems tenants in the multi-system tenant landscape.

15. The system of claim 12, wherein:
- the first cell identifies the first system tenant as a lead system tenant that is a source of truth for the first entity;
- the routing policy is a lead system policy that indicates that the first system tenant is the target system tenant; and
- the request is provided to the first system tenant.

16. The system of claim 15, wherein:
- a second system tenant is configured in the routing policy table as the source of truth for the first entity;
- the first cell identifies the first system tenant as including a consistent replica of the first entity;
- the routing policy is a local reference policy that indicates that the first system tenant is the target system tenant based on the first system tenant including the consistent replica of the first entity; and
- the request is provided to the first system tenant.

17. A computer program product encoded on a non-transitory storage medium, the product comprising non-transitory, computer readable instructions for causing one or more processors to perform operations comprising:
- receiving, from a client application, a request for data for at least one entity, wherein the request includes a first system tenant qualifier that identifies a first system tenant in a multi-system tenant landscape and a first local identifier that identifies an entity instance of a first entity in the first system tenant;
- locating a first cell that corresponds to the first entity and the first system tenant in a routing policy table configured for the multi-system tenant landscape, wherein the first cell identifies a routing policy for routing the request to a target system tenant;
- providing, to the target system tenant, the request, based on the routing policy;
- receiving, from the target system tenant, a response to the request; and
- providing, to the client application and in response to the request, the response.

18. The computer program product of claim 17, wherein the operations further comprise:
- before providing the request to the target system, translating the request from a unified model that represents commonality of respective data models used by multiple system tenants into a target data model of the target system tenant; and
- before providing the response to the client application, translating the response from the target data model to the unified model.

19. The computer program product of claim 17, wherein the request is sent using a unified API (Application Programming Interface) that enables the client application to request data from any of the systems tenants in the multi-system tenant landscape.

20. The computer program product of claim 17, wherein:
- the first cell identifies the first system tenant as a lead system tenant that is a source of truth for the first entity;
- the routing policy is a lead system policy that indicates that the first system tenant is the target system tenant; and
- the request is provided to the first system tenant.

* * * * *